(12) United States Patent
Kwon et al.

(10) Patent No.: US 10,134,487 B2
(45) Date of Patent: Nov. 20, 2018

(54) SEMICONDUCTOR MEMORY DEVICE AND MEMORY SYSTEM INCLUDING THE SAME

(71) Applicant: Samsung Electronics Co., Ltd., Suwon-si (KR)

(72) Inventors: Sang-Hyuk Kwon, Seoul (KR); Young-Hoon Son, Suwon-si (KR); Jung-Ho Ahn, Suwon-si (KR)

(73) Assignees: SAMSUNG ELECTRONICS CO., LTD., Samsung-ro, Yeongtong-gu, Suwon-si, Gyeonggi-do (KR); SNU R&DB FOUNDATION, Gwanak-ro, Gwanak-gu, Seoul (KR)

( * ) Notice: Subject to any disclaimer, the term of this patent is extended or adjusted under 35 U.S.C. 154(b) by 120 days.

(21) Appl. No.: 14/713,140

(22) Filed: May 15, 2015

(65) Prior Publication Data

US 2016/0203044 A1 Jul. 14, 2016

(30) Foreign Application Priority Data

Jan. 12, 2015 (KR) ........................ 10-2015-0004020

(51) Int. Cl.
*G11C 29/00* (2006.01)
*G09C 1/00* (2006.01)
(Continued)

(52) U.S. Cl.
CPC ............... *G11C 29/76* (2013.01); *G09C 1/00* (2013.01); *H04L 9/0643* (2013.01);
(Continued)

(58) Field of Classification Search
CPC ............. G06F 12/0246; G06F 17/3033; G06F 11/2094; G06F 12/0802; G06F 11/0766;
(Continued)

(56) References Cited

U.S. PATENT DOCUMENTS 4,903,194 A * 2/1990 Houdek .............. G06F 11/1016
714/53
6,138,254 A * 10/2000 Voshell ................... G06F 12/02
710/68

(Continued)

OTHER PUBLICATIONS

Jie Chen et al. / RePRAM: Re-cycling PRAM Faulty Blocks for Extended Lifetime / 12 Pages.
(Continued)

*Primary Examiner* — April Y Blair
*Assistant Examiner* — Sazzad Hossain
(74) *Attorney, Agent, or Firm* — Muir Patent Law, PLLC

(57) ABSTRACT

A memory device may include a memory cell array, a bloom-filter circuit, a cache memory circuit, and a selecting circuit. The bloom-filter circuit may be configured to output a determination result signal that indicates that there is a possibility that a received address is one of failed addresses corresponding to failed cells of the memory cell array. The cache memory circuit may be configured to, store the failed addresses and a first set of data corresponding to the respective failed addresses, and configured to, when the determination result signal indicates a possibility, provide a comparison result signal by determining whether received address coincides with one of the failed addresses. The selecting circuit may be configured to output either first data of the first set of data or second data of the memory cell array corresponding to the received address based on determination result signal and comparison result signal.

19 Claims, 15 Drawing Sheets

(51) Int. Cl.
*H04L 9/06* (2006.01)
*G06F 11/07* (2006.01)
*G06F 11/20* (2006.01)
*G06F 11/10* (2006.01)
*G06F 12/02* (2006.01)
*G06F 17/30* (2006.01)
*G06F 12/0802* (2016.01)
*G11C 29/44* (2006.01)

(52) U.S. Cl.
CPC ...... *G06F 11/0766* (2013.01); *G06F 11/1016* (2013.01); *G06F 11/2094* (2013.01); *G06F 12/0246* (2013.01); *G06F 12/0802* (2013.01); *G06F 17/3033* (2013.01); *G06F 2212/1032* (2013.01); *G11C 2029/4402* (2013.01); *H04L 2209/12* (2013.01)

(58) Field of Classification Search
CPC ......... G06F 11/1016; G06F 2212/1032; G11C 2029/4402; G11C 29/76; G11C 29/12; H04L 2209/12; H04L 9/0643
USPC .......................................... 714/767; 365/200
See application file for complete search history.

(56) References Cited

U.S. PATENT DOCUMENTS

| | | | |
|---|---|---|---|
| 6,385,071 B1 | 5/2002 | Chai et al. | |
| 6,937,533 B2 | 8/2005 | Hojo et al. | |
| 7,620,781 B2 | 11/2009 | Breternitz, Jr. et al. | |
| 7,630,258 B2 | 12/2009 | Fong | |
| 7,813,194 B2 | 10/2010 | Martin et al. | |
| 8,134,879 B2 | 3/2012 | Kim | |
| 8,324,958 B2 | 12/2012 | Lee | |
| 8,467,260 B2 | 6/2013 | Gorman et al. | |
| 8,520,457 B2 | 8/2013 | Inoue et al. | |
| 2011/0072190 A1* | 3/2011 | Borracini | G06F 12/0246 711/103 |
| 2012/0221902 A1 | 8/2012 | Ware et al. | |
| 2013/0083612 A1* | 4/2013 | Son | G11C 29/4401 365/200 |
| 2013/0179740 A1 | 7/2013 | Jeddeloh | |
| 2013/0250707 A1 | 9/2013 | Vishal et al. | |
| 2015/0092494 A1* | 4/2015 | Rhie | G11C 16/16 365/185.12 |
| 2015/0261632 A1* | 9/2015 | Kim | G06F 11/2053 714/6.11 |

OTHER PUBLICATIONS

Prashant J. Nair et al. /ArchShield: Architectural Framework for Assisting DRAM Scaling by Tolerating High Error Rates/ISCA 2013/12 Pages.
Seongil O et al. /CIDR: A Cache Inspired Area-Efficient DRAM Resilience Architecture against Permanent Faults/IEEE LCA 2014/4 Pages.

* cited by examiner

SEMICONDUCTOR MEMORY DEVICE AND MEMORY SYSTEM INCLUDING THE SAME

CROSS-REFERENCE TO RELATED APPLICATION

This application claims priority under 35 USC § 119 to Korean Patent Applications No. 10-2015-0004020, filed on Jan. 12, 2015 in the Korean Intellectual Property Office (KIPO), the contents of which are herein incorporated by reference in their entirety.

BACKGROUND

1. Technical Field

The present disclosure relates generally to a semiconductor device and more particularly to a memory device and a memory system including the memory device.

2. Description of the Related Art

During manufacturing processes of memory devices, bad cells may be caused in a memory cell array of a memory device. If data is written in the bad cell corresponding to a failed address or the data is read from the bad cell, errors may be generated. Therefore, it is useful to block access to the bad cell included in the memory cell array.

SUMMARY

Some example embodiments provide a memory device capable of increasing performance using a cache memory based on a bloom-filter.

Some example embodiments provide a memory system capable of increasing the performance using the cache memory based on the bloom-filter.

According to example embodiments, a memory device including a memory cell array includes a bloom-filter circuit, a cache memory circuit, and a selecting circuit. The bloom-filter circuit is configured to output a determination result signal that indicates that there is a possibility that a received address is one of failed addresses corresponding to failed cells of the memory cell array. The cache memory circuit is configured to store the failed addresses and a first set of data corresponding to the respective failed addresses. The cache memory circuit is configured to, when the determination result signal indicates a possibility, provide a comparison result signal by determining whether the received address coincides with one of the failed addresses. The selecting circuit is configured to output either first data of the first set of data or second data of the memory cell array corresponding to the received address based on the determination result signal and the comparison result signal.

The bloom-filter circuit may include a hash function circuit and a hash array circuit. The hash function circuit may be configured to output an m-bit code by combining n bits of the received address, each of m and n is a natural number, and m is less than n. The hash array circuit may be configured to store a first set of one or more m-bit codes corresponding to the failed addresses, wherein the first set of one or more m-bit codes are generated by the hash function circuit in response to the failed addresses.

The received address hash result may be generated by applying address bits of the received address to inputs of logic gate.

The bloom-filter circuit may be configured to output the determination result signal by comparing the received address hash result to the failed address hash results.

The bloom-filter circuit may be configured to, when the m-bit code corresponding to the received address coincides with a code of the first set of codes, output the determination result signal having a first logic level.

The bloom-filter circuit may be configured to, when the m-bit code corresponding to the received address does not coincide with any code of the first set of codes corresponding to the failed addresses, output the determination result signal having a second logic level opposite to the first logic level.

The cache memory circuit may include a cache address circuit and a cache data circuit. The cache address circuit may be configured to store the failed addresses. The cache data circuit may be configured to store the first set of data.

The cache address circuit may be configured to output the comparison result signal based on a result of a comparison between the received address and the failed addresses.

The cache address circuit may be configured to, when the determination result signal is a first logic level, determine whether or not the received address coincides with one of the failed addresses. The cache address circuit may be configured to, when the received address coincides with one of the failed addresses, output the comparison result signal having the first logic level.

The selecting circuit may be configured to, when the comparison result signal is the first logic level, output the first data in response to to the comparison result signal.

The cache address circuit may be configured to, when the determination result signal is a first logic level, determine whether or not the received address coincides with one of the failed addresses. The cache address circuit may be configured to, when the received address does not coincide with any one of the failed addresses, output the comparison result signal having a second logic level opposite to the first logic level.

The cache address circuit may be configured to, when the determination result signal is the second logic level, output the comparison result signal having the second logic level.

The selecting circuit may be configured to, when the determination result signal is a first logic level and the comparison result signal is the first logic level, select the first data. The selecting circuit may be configured to, when the determination result signal is a second logic level opposite to the first logic level or the comparison result signal is the second logic level, select the second data.

A memory system may include a memory controller and the memory device. The memory controller may be configured to output the received address and a command. The memory device may be configured to receive the received address and the command.

The memory device may include a column decoder and a memory cell array. The column decoder may be configured to output a column selection signal corresponding to the received address. The memory cell array may be configured to output the second data in response to the column selection signal.

When the received address coincides with the one of the failed addresses, a part of bits of the first set of data may be provided to the selecting circuit.

A time interval between the first data and the second data may be controlled using a delay circuit.

According to example embodiments, a method of operating a memory device including a memory cell array is provided. The method includes: storing a first set of one or more codes, each code having m bits and corresponding to respective one or more failed n-bit addresses, the first set of one or more codes being generated by combining bits of the respective one or more failed n-bit addresses, wherein each of m and n is a natural number and m is less than n; storing the one or more failed n-bit addresses and a first set of data corresponding to the one or more failed n-bit addresses; comparing the first set of one or more codes to an m-bit code, the m-bit code corresponding to a received n-bit address and generated by combining bits of the received n-bit address; when the m-bit code corresponding to the received n-bit address matches a code of the stored codes, comparing the received n-bit address to the stored failed n-bit addresses; when the received address coincides with one of the stored failed addresses, selecting first data of the first set of data; and when the received address does not coincide with any one of the stored failed addresses, selecting second data of the memory cell array corresponding to the received n-bit address.

The cache address circuit may be divided into a plurality of address storing regions. Each of the plurality of the address storing regions may be configured to store the failed addresses.

According to example embodiments, a memory device includes: a first circuit configured to output a first output signal indicating whether or not the memory device has a possibility of coincidence between a received n-bit address and one of one or more failed n-bit addresses, n being a natural number greater than 1; a second circuit configured to store the one or more failed n-bit addresses and a first set of data corresponding to respective one or more failed n-bit addresses, and in response to the first output signal, output a second output signal indicating whether or not the received n-bit address coincides with one of the one or more failed n-bit addresses; and a selecting circuit configured to output either first data of the first set of data or second data of the memory cell array corresponding to the received n-bit address based on the first and second output signals.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
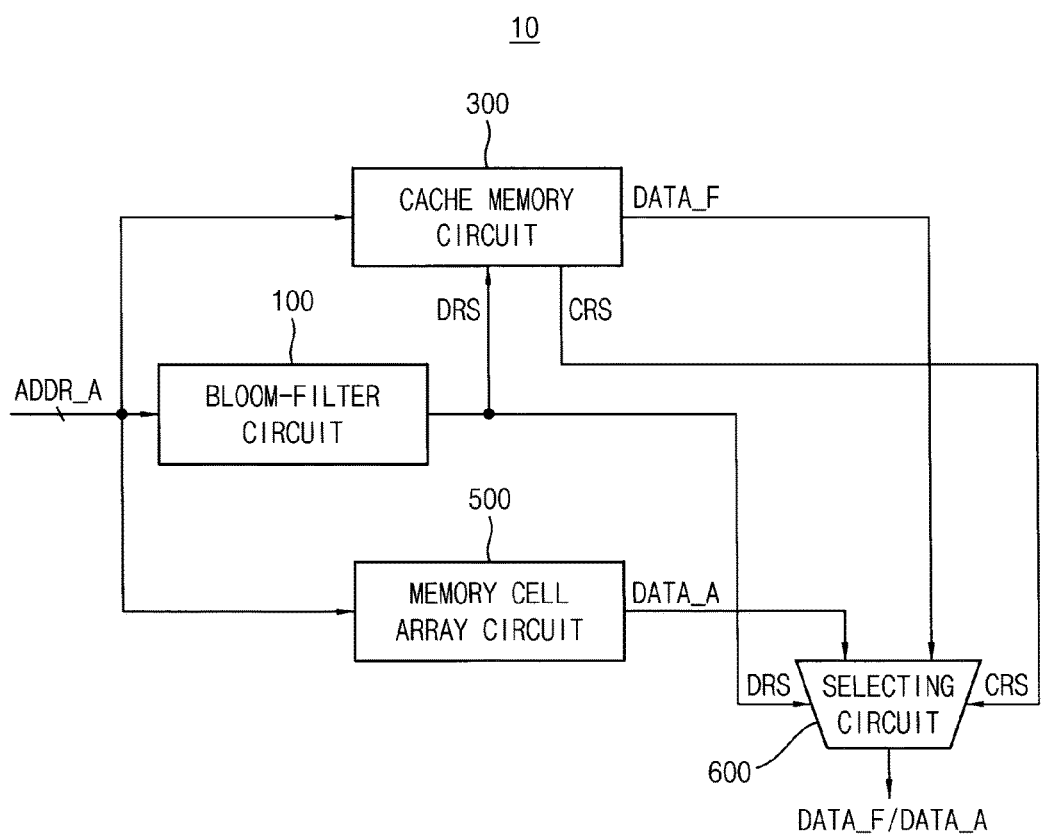
FIG. 1 is a block diagram illustrating a memory device according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. Unless indicated otherwise, these terms are used to distinguish one element from another. Thus, a first element discussed below could be termed a second element without departing from the teachings of the present inventive concept. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
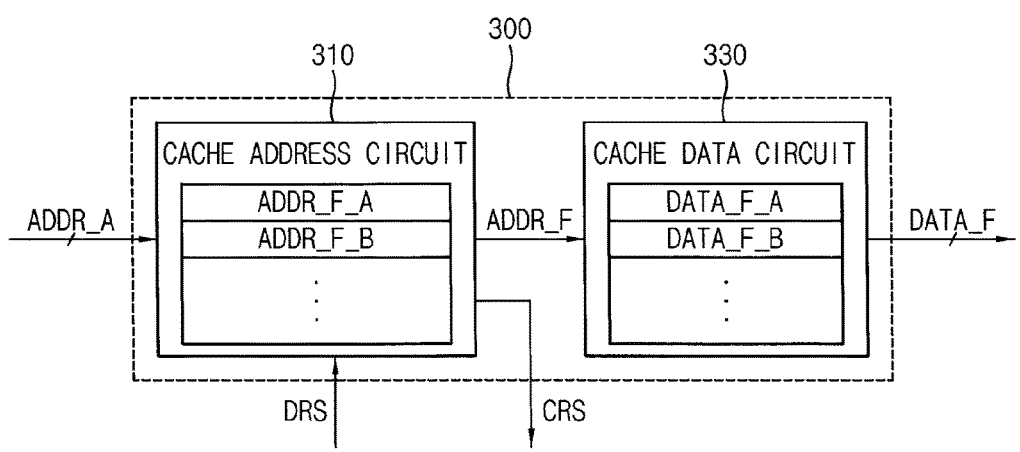
FIG. 2 is a block diagram illustrating a cache memory circuit included in the memory device of FIG. 1 according to example embodiments.

FIG. 1 is a block diagram illustrating a memory device according to example embodiments. FIG. 2 is a block diagram illustrating a cache memory circuit included in the memory device of FIG. 1 according to example embodiments.

Referring to FIGS. 1 and 2, a memory device 10 includes a bloom-filter circuit 100, a cache memory circuit 300, a memory cell array circuit 500 and a selecting circuit 600.

The bloom-filter circuit 100 receives addresses ADDR_A and outputs a determination result signal DRS (which may also be referred to as a first comparison result signal) by determining possibility. The possibility refers to a possibility that a received address ADDR_A (which may be an access address for accessing a memory) is one of failed addresses ADDR_F corresponding to failed cells of the memory cell array circuit 500. For example, when the received address ADDR_A coincides with one of the failed addresses ADDR_F, the determination result signal DRS outputted from the bloom-filter circuit 100 may be a first logic level. Also when the received address ADDR_A does not coincide with any one of the failed addresses ADDR_F, the determination result signal DRS outputted from the bloom-filter circuit 100 may be a second logic level opposite to the first logic level. This may indicate that the received address is not one of the failed addresses. However, even though the received address ADDR_A does not coincide with any one of the failed addresses ADDR_F, the determination result signal DRS outputted from the bloom-filter circuit 100 may be the first logic level. Process of determining the determination result signal DRS will be described referring to FIGS. 8 to 10. The first logic level may be a logic high level. If the first logic level is the logic high level, the second logic level may be a logic low level. Also the first logic level may be the logic low level. If the first logic level is the logic low level, the second logic level may be the logic high level.

In one embodiment, the cache memory circuit 300 may include a cache address circuit 310 and a cache data circuit 330. The cache memory circuit 300 may store the failed addresses ADDR_F and data corresponding to the respective failed addresses ADDR_F. The failed addresses ADDR_F may be stored in the cache address circuit 310. The data corresponding to the respective failed addresses ADDR_F may be stored in the cache data circuit 330. The cache memory circuit 300 may receive received addresses ADDR_A and generate a comparison result signal CRS (which may be referred to as a second comparison result signal) by determining whether the received address ADDR_A coincides with one of the failed addresses ADDR_F or not, based on the determination result signal DRS. For example, when the determination result signal DRS is the first logic level, the cache memory circuit 300 may determine whether the received address ADDR_A coincides with one of the failed addresses ADDR_F or not. For example, the cache memory circuit 300 may compare the received address ADDR_A to the failed addresses ADDR_F when the determination result signal DRS is the first logic level. In one embodiment, when the determination result signal DRS is the second logic level, the cache memory circuit 300 may not determine whether the received address ADDR_A coincides with one of the failed addresses ADDR_F or not. For example, the cache memory circuit 300 may be prevented from comparing the received address to the stored failed addresses by a prevention signal or disable signal. Therefore, the cache memory circuit 300 may not be used to compare every received address ADDR_A to the respective failed addresses ADDR_F, such that a power consumption of the memory device may be reduced. When the access address ADDR_A coincides with one of the failed addresses ADDR_F, the cache address circuit 310 may output the comparison result signal CRS having the first logic level. Even though the determination result signal DRS is the first logic level, if the received address ADDR_A does not coincide with any one of the failed addresses ADDR_F, the cache address circuit 310 may output the comparison result signal CRS having the second logic level. Also, when the determination result signal DRS is the second logic level, the cache address circuit 310 may output the comparison result signal CRS having the second logic level.

The cache memory circuit 300 outputs data corresponding to the failed address ADDR_F as repair data DATA_F when the received address ADDR_A coincides with one of failed addresses ADDR_F. For example, when the received address ADDR_A coincides with a first failed address ADDR_F_A, the cache memory circuit 300 may output first repair data DATA_F_A corresponding to the first failed address ADDR_F_A. Also, when the received address ADDR_A coincides with a second failed address ADDR_F_B, the cache memory circuit 300 may output second repair data DATA_F_B corresponding to the second failed address ADDR_F_B. In one embodiment, if the received address ADDR_A coincides one of the failed addresses ADDR_F, data may be read or written from/to the cache data circuit 330 instead of the memory cell array circuit 500 during a read or a write operation of the memory device 10. In one embodiment, the cache address circuit 310 may include a plurality of address storing regions each storing one of the failed addresses ADDR_F, and the cache data circuit 330 may include a plurality of data storing regions each storing data corresponding to the respective failed addresses ADDR_F.

In one embodiment, the cache memory circuit 300 may be one of a static random access memory (SRAM), a phase random access memory (PRAM), a ferroelectric random access memory (FRAM), a resistive random access memory (RRAM), and a magnetic random access memory (MRAM), etc.

The memory cell array circuit 500 including a memory cell array, outputs data corresponding to the received address ADDR_A as a read data DATA_A. The selecting circuit 600 selects one of the read data DATA_A and the repair data DATA_F based on the determination result signal DRS and the comparison result signal CRS. For example, if the determination result signal DRS is the first logic level and the comparison result signal CRS is the first logic level, the selecting circuit 600 may select the repair data DATA_F. If the determination result signal DRS is the first logic level and the comparison result signal CRS is the second logic level, the selecting circuit 600 may select the read data DATA_A. If the determination result signal DRS is the second logic level, the selecting circuit 600 may select the read data DATA_A.

When the memory device 10 is implemented using a cache memory circuit based on the bloom-filter circuit disclosed herein, a space of the cache memory circuit and the bloom-filter circuit included in the memory device 10 may be efficiently decreased.

Figure 3:
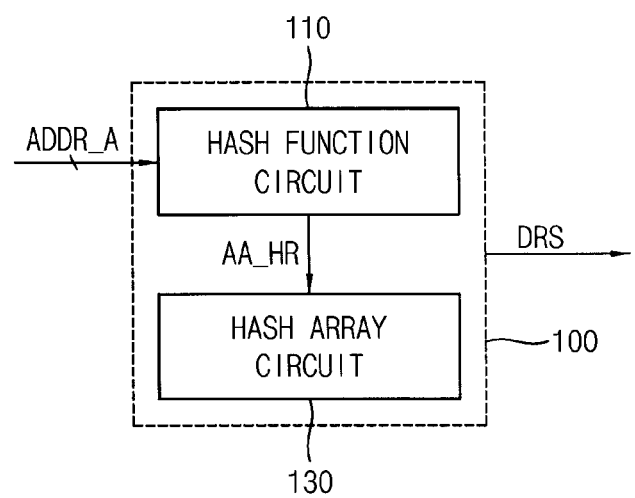
FIG. 3 is a block diagram illustrating a bloom-filter circuit included in the memory device of FIG. 1 according to example embodiments.
Figure 4:
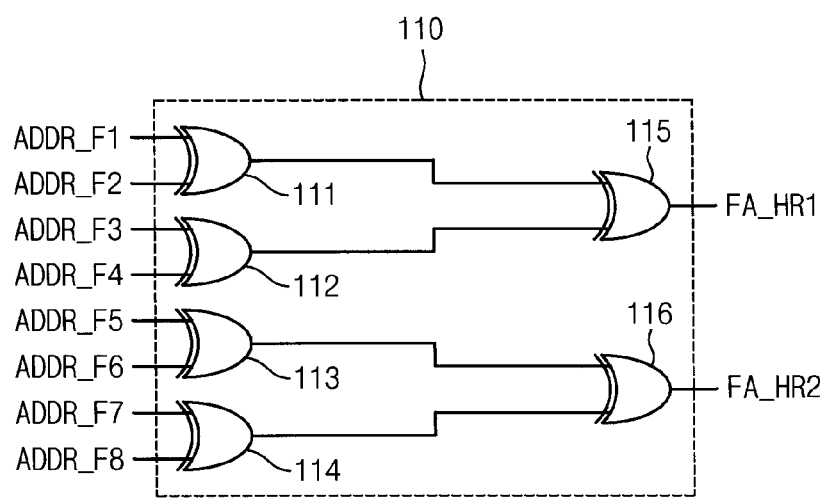
FIG. 4 is a circuit diagram illustrating an example of a failed address transferred to a hash function circuit included in the bloom-filter circuit of FIG. 3 according to example embodiments.

FIG. 3 is a block diagram illustrating a bloom-filter circuit included in the memory device of FIG. 1 according to example embodiments. FIG. 4 is a circuit diagram illustrating an example of a failed address transferred to a hash function circuit included in the bloom-filter circuit of FIG. 3 according to example embodiments.

Referring to FIGS. 3 and 4, the bloom-filter circuit 100 may include a hash function circuit 110 and a hash array circuit 130. In one embodiment, the hash function circuit 110 may receive an address ADDR_A (e.g., an access address) and output a received address hash result AA_HR by combining address bits of the received address ADDR_A. The received address hash result AA_HR, generally referred to herein as a "code," may have a lesser number of bits than the number of the address bits of the received address ADDR_A. When the received address ADDR_A is one of the failed addresses ADDR_F, the hash array circuit 130 may store failed address hash results FA_HR corresponding to the failed address ADDR_F. Thus, an area used to store the failed address hash results FA_HR may be less than an area used to store the failed address ADDR_F. In one embodiment, the failed address hash result FA_HR may be generated by applying each of address bits of the failed address ADDR_F to an input of a logic gate. For example, a first failed address bit ADDR_F1 and a second failed address bit ADDR_F2 of the failed address ADDR_F may be transferred to inputs of a first exclusive-OR gate 111. A third failed address bit ADDR_F3 and a fourth failed address bit ADDR_F4 of the failed address ADDR_F may be transferred to inputs of a second exclusive-OR gate 112. A fifth failed address bit ADDR_F5 and a sixth failed address bit ADDR_F6 of the failed address ADDR_F may be transferred to inputs of a third exclusive-OR gate 113. A seventh failed address bit ADDR_F7 and an eighth failed address bit ADDR_F8 of the failed address ADDR_F may be transferred to inputs of a fourth exclusive-OR gate 114. For example, outputs of the first exclusive-OR gate 111 and the second exclusive-OR gate 112 may be transferred to a fifth exclusive-OR gate 115. Outputs of the third exclusive-OR gate 113 and the fourth exclusive-OR gate 114 may be transferred to a sixth exclusive-OR gate 116. Output of the fifth exclusive-OR gate 115 may be a first bit FA_HR1 of the failed address hash result FA_HR. Output of the sixth exclusive-OR gate 116 may be a second bit FA_HR2 of the failed address hash result FA_HR. The hash array circuit 130 may store the first bit FA_HR1 and the second bit FA_HR2 of the failed address hash result FA_HR. For example, the first and second bits FA_HR1 and FA_HR2 may be referred to as a code. A set of one or more codes may correspond to a plurality of failed addresses (e.g., the number of codes may be smaller than the number of bits of an address).

A hash operation performed in the hash function circuit 110 may be implemented using the logic gates. However, the invention is not limited to the exemplary logic gates described herein. For example, the hash operation may be implemented using a method of shifting or rotating address bits.

Figure 5:
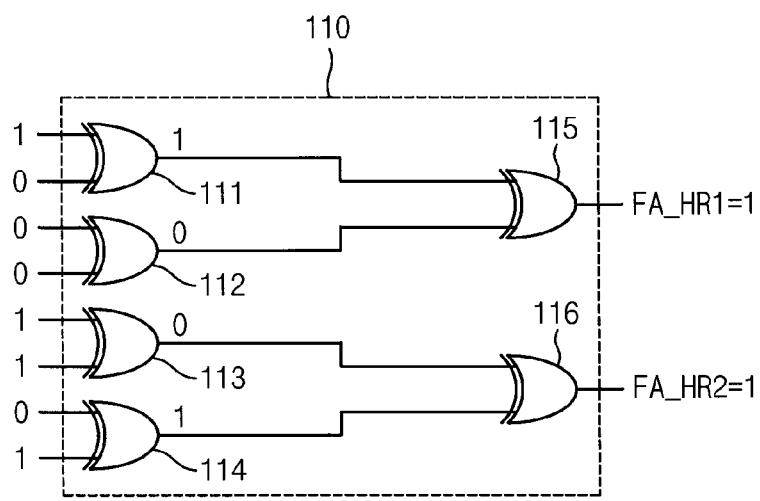
FIGS. 5 and 6 are diagrams for describing process of outputting a failed address hash result when the failed address is transferred to the hash function circuit of FIG. 4 according to example embodiments.
Figure 6:
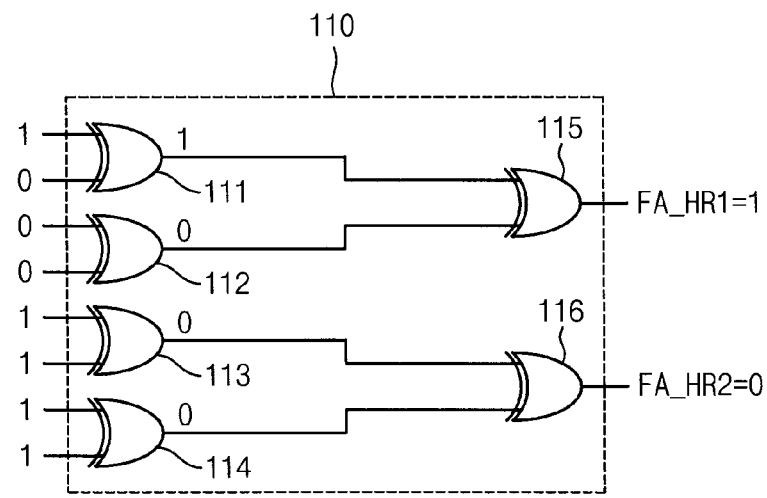
Figure 7:
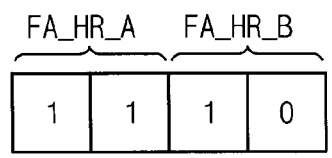
FIG. 7 is a diagram illustrating an example of a hash array circuit included in the bloom-filter circuit of FIG. 3 according to example embodiments.

FIGS. 5 and 6 are diagrams for describing a process of outputting a fail-address hash result when the fail-address is transferred to the hash function circuit of FIG. 4 according to example embodiments. FIG. 7 is a diagram illustrating an example of a hash array circuit included in the bloom-filter circuit of FIG. 3 according to example embodiments.

Referring to FIGS. 5 to 7, the hash function circuit 110 may output the failed address hash result FA_HR by combining address bits of the failed address ADDR_F. The failed address hash result FA_HR may have a lesser number of bits than the number of address bits of the failed address ADDR_F. The hash array circuit 130 may store failed address hash results FA_HR corresponding to the failed addresses ADDR_F.

In one embodiment, for example, a failed address ADDR_F may be 0x10001101. The first failed address bit "1" and the second failed address bit "0" of the failed address ADDR_F may be transferred to the inputs of the first exclusive-OR gate 111. The third failed address bit "0" and the fourth failed address bit "0" of the failed address ADDR_F may be transferred to the inputs of the second exclusive-OR gate 112. The fifth failed address bit "1" and the sixth failed address bit "1" of the failed address ADDR_F may be transferred to the inputs of the third exclusive-OR gate 113. The seventh failed address bit "0" and the eighth failed address bit "1" of the failed address ADDR_F may be transferred to the inputs of the fourth exclusive-OR gate 114. Outputs of the first exclusive-OR gate 111 and the second exclusive-OR gate 112 may be "1" and "0." The outputs "1" and "0" of the first exclusive-OR gate 111 and the second exclusive-OR gate 112 may be transferred to the fifth exclusive-OR gate 115. Outputs of the third exclusive-OR gate 113 and the fourth exclusive-OR gate 114 may be "0" and "1." The Outputs "0" and "1" of the third exclusive-OR gate 113 and the fourth exclusive-OR gate 114 may be transferred to the sixth exclusive-OR gate 116.

Output of the fifth exclusive-OR gate 115 may be a first bit FA_HR1 of the failed address hash result FA_HR. The output of the fifth exclusive-OR gate 115 may be "1." The output of the sixth exclusive-OR gate 116 may be a second bit FA_HR2 of the failed address hash result FA_HR. The output of the sixth exclusive-OR gate 116 may be "1." Thus, the failed address hash result FA_HR may be "11." The hash array circuit 130 may store the first bit FA_HR1 and the second bit FA_HR2 of the failed address hash result FA_HR. Thus, the failed address hash result FA_HR "11" may be stored as one of the codes (e.g., a 2-bit code) in the hash array circuit 130 as shown in FIG. 7.

For example, a failed address ADDR_F may be 0x10001111. When the failed address ADDR_F 0x10001111 is transferred to the hash function circuit 110, the hash function circuit 110 may output "10" as the failed address hash result FA_HR in the same way. For example, the fail-address hash result FA_HR "10" may be stored in the hash array circuit 130 as shown in FIG. 7. Thus, in certain embodiments, based on failed addresses, a plurality of m-bit codes may be stored, which each indicates that at least one failed address exists.

Figure 8:
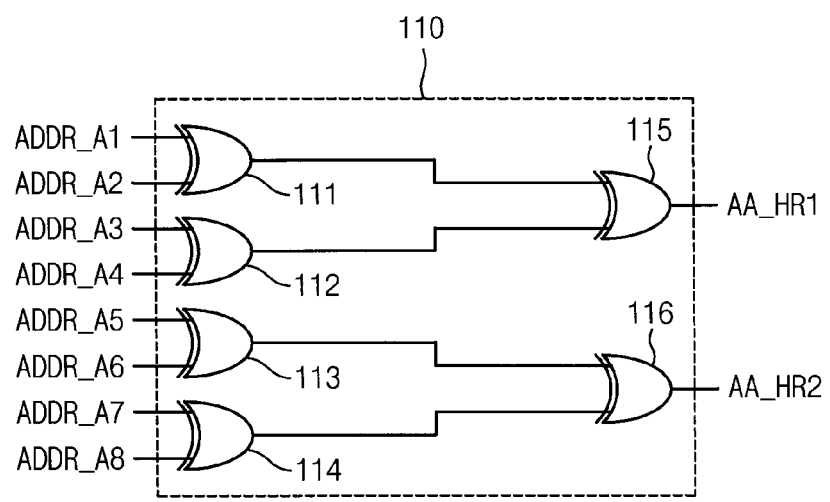
FIG. 8 a circuit diagram illustrating an example of a received address transferred to the hash function circuit included in the bloom-filter circuit of FIG. 3 according to example embodiments.

FIG. 8 a circuit diagram illustrating an example of a received address transferred to the hash function circuit included in the bloom-filter circuit of FIG. 3 according to example embodiments.

Referring to FIG. 8, the hash function circuit 110 may include a plurality of logic gates 111 to 116. The received address hash result AA_HR may be generated by applying address bits of the received address ADDR_A to inputs of the logic gates 111 to 116. The hash function circuit 110 may output the received address hash result AA_HR by combining address bits of the received address ADDR_A. The received address hash result AA_HR may have a lesser number of bits than the number of the address bits of the received address ADDR_A.

For example, the received address hash result AA_HR may be generated by applying each of address bits of the received address ADDR_A to the input of the logic gate. A first received address bit ADDR_A1 and a second received address bit ADDR_A2 of the received address ADDR_A may be transferred to the inputs of the first exclusive-OR gate 111. A third assesses address bit ADDR_A3 and a fourth received address bit ADDR_A4 of the received address ADDR_A may be transferred to the inputs of the second exclusive-OR gate 112. A fifth received address bit ADDR_A5 and a sixth received address bit ADDR_A6 of the received address ADDR_A may be transferred to the inputs of the third exclusive-OR gate 113. A seventh received address bit ADDR_A7 and an eighth received address bit ADDR_A8 of the received address ADDR_A may be transferred to the inputs of the fourth exclusive-OR gate 114. Outputs of the first exclusive-OR gate 111 and the second exclusive-OR gate 112 may be transferred to the fifth exclusive-OR gate 115. Outputs of the third exclusive-OR gate 113 and the fourth exclusive-OR gate 114 may be transferred to the sixth exclusive-OR gate 116. An output of the fifth exclusive-OR gate 115 may be a first bit AA_HR1 of the received address hash result AA_HR. An output of the sixth exclusive-OR gate 116 may be a second bit AA_HR2 of the received address hash result AA_HR. The hash array circuit 130 may store the first bit AA_HR1 and the second bit AA_HR2 of the received address hash result AA_HR.

In one embodiment, the hash array circuit 130 may compare the first and second bits AA_HR1 and AA_HR2 of the received address hash result AA_HR to the first and second bits FA_HR1 and FA_HR2 of the fail-address hash result FA_HR that is stored in the hash array circuit 130. When the received address hash result AA_HR coincides with the failed address hash result FA_HR (e.g., with one of the codes), the determination result signal DRS outputted from the bloom-filter circuit 100 may be a first logic level. When the received address hash result AA_HR does not coincide with the failed address hash result FA_HR, the determination result signal DRS outputted from the bloom-filter circuit 100 may be a second logic level opposite to the first logic level. The first logic level may indicate that the received address is a possible failed address. The second logic level may indicate that the received address is not a failed address.

Figure 9:
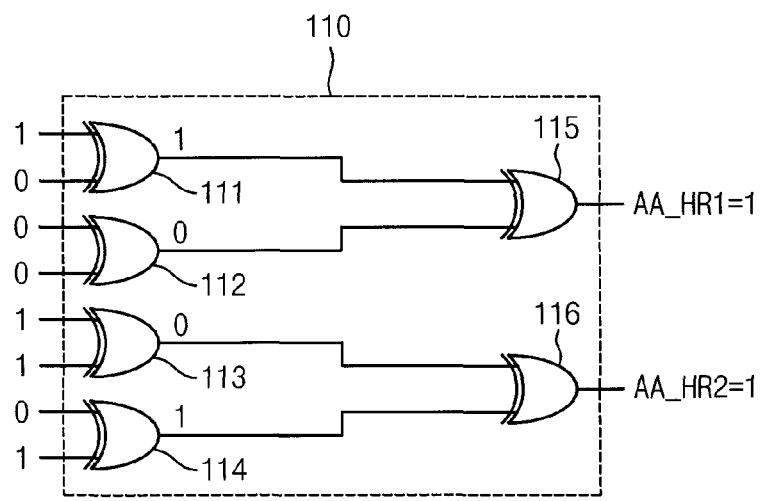
FIGS. 9 to 11 are diagrams for describing process of outputting an received address hash result when the received address is transferred to the hash function circuit of FIG. 4 according to example embodiments.
Figure 10:
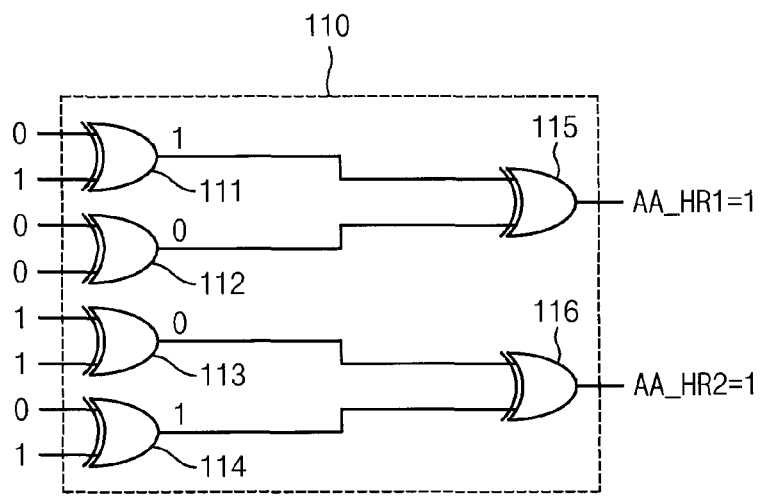
Figure 11:
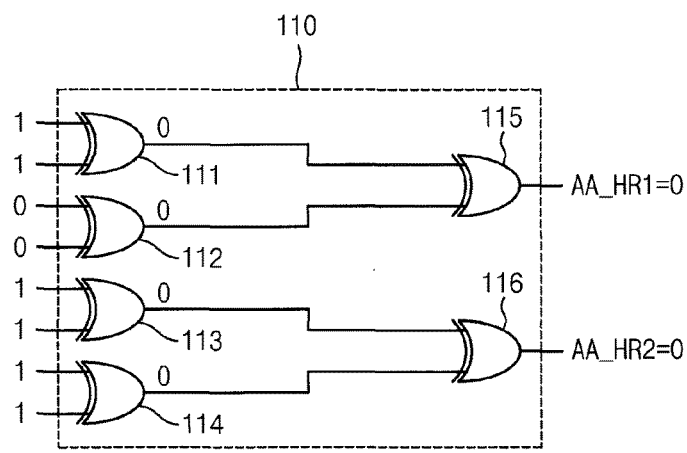

FIGS. 9 to 11 are diagrams for describing process of outputting an received address hash result when the received address is transferred to the hash function circuit of FIG. 4 according to example embodiments.

Referring to FIG. 9, the hash function circuit 110 may output the received address hash result AA_HR by combining address bits of the received address ADDR_A. The received address hash result AA_HR may have a lesser number of bits than the number of the address bits of the received address ADDR_A.

For example, the received address ADDR_A may be an n-bit address, such as 0x10001101 (e.g., 8-bits). The first received address bit "1" and the second received address bit "0" of the received address ADDR_A may be transferred to the inputs of the first exclusive-OR gate 111. The third received address bit "0" and the fourth received address bit "0" of the received address ADDR_A may be transferred to the inputs of the second exclusive-OR gate 112. The fifth received address bit "1" and the sixth received address bit "1" of the received address ADDR_A may be transferred to the inputs of the third exclusive-OR gate 113. The seventh received address bit "0" and the eighth received address bit "1" of the received address ADDR_A may be transferred to the inputs of the fourth exclusive-OR gate 114. Outputs of the first exclusive-OR gate 111 and the second exclusive-OR gate 112 may be "1" and "0." The outputs "1" and "0" of the first exclusive-OR gate 111 and the second exclusive-OR gate 112 may be transferred to the fifth exclusive-OR gate 115. Outputs of the third exclusive-OR gate 113 and the fourth exclusive-OR gate 114 may be "0" and "1." The Outputs "0" and "1" of the third exclusive-OR gate 113 and the fourth exclusive-OR gate 114 may be transferred to the sixth exclusive-OR gate 116.

Output of the fifth exclusive-OR gate 115 may be a first bit AA_HR1 of the received address hash result AA_HR. The Output of the fifth exclusive-OR gate 115 may be "1" The output of the sixth exclusive-OR gate 116 may be the second bit AA_HR2 of the received address hash result AA_HR. The output of the sixth exclusive-OR gate 116 may be "1." Thus, the received address hash result AA_HR may be "11."

For example, failed addresses ADDR_F may be 0x10001101 and 0x10001111. The failed address hash result FA_HR corresponding to the failed address ADDR_F 0x10001101 may be "11." The failed address hash result FA_HR corresponding to the failed address ADDR_F 0x10001111 may be "10." Before the received address hash result AA_HR is compared to the failed address hash result FA_HR, the failed address hash results FA_HR may be stored in the hash array circuit 130. The failed address hash results FA_HR stored in the hash array circuit 130 may be "11" and "10." For example, when the received address ADDR_A 0x10001101 coincides with 0x10001101 included in the failed addresses ADDR_F, the received address hash result AA_HR "11" coincides with "11" included in the failed address hash results FA_HR. Because the received address ADDR_A coincides with one of the failed address ADDR_F and the received address hash result AA_HR coincides with the failed address hash result FA_HR, the determination result signal DRS outputted from the bloom-filter circuit 100 may be a first logic level.

In an example embodiment, the bloom-filter circuit 100 may output the determination result signal DRS by comparing the received address hash result AA_HR to one of the fail-address hash results FA_HR.

In an example embodiment, when the received address hash result AA_HR coincides with one of the fail-address hash results FA_HR, the bloom-filter circuit 100 may output the determination result signal DRS having a first logic level.

Referring to FIG. 10, the hash function circuit 110 may output the received address hash result AA_HR by combining address bits of the received address ADDR_A. The received address hash result AA_HR may have a lesser number of bits than the number of the address bits of the received address ADDR_A. For example, the received address ADDR_A may be 0x01001101. When the received address ADDR_A 0x01001101 is transferred to the hash function circuit 110, the hash function circuit 110 may output "11" as the received address hash result AA_HR in the same way.

For example, the failed addresses ADDR_F may be 0x10001101 and 0x10001111. The failed address hash result FA_HR corresponding to the failed address ADDR_F 0x10001101 may be "11." The failed address hash result FA_HR corresponding to the fail-address ADDR_F 0x10001111 may be "10." Before the received address hash result AA_HR is compared to the failed address hash results FA_HR, the failed address hash results FA_HR "11" and "10" may be stored in the hash array circuit 130. For example, the received address ADDR_A 0x01001101 does not coincide with any one of 0x10001101 and 0x10001111 included in the failed addresses ADDR_F. However, the received address hash result AA_HR "11" corresponding to the received address ADDR_A 0x01001101 may coincide with "11" corresponding to the failed address ADDR_F 0x10001101 included in the fail-address hash results FA_HR. Even though the received address ADDR_A does not coincide with any one of the failed addresses ADDR_F, because the received address hash result AA_HR coincides with one of the fail-address hash results FA_HR, the determination result signal DRS outputted from the bloom-filter circuit 100 may be the first logic level. Thus, even though the determination result signal DRS is the first logic level, the received address ADDR_A may not be included in the failed addresses ADDR_F.

Referring to FIG. 11, the hash function circuit 110 may output the received address hash result AA_HR by combining address bits of the received address ADDR_A. The received address hash result AA_HR may have a lesser number of bits than the number of the address bits of the received address ADDR_A. For example, the received address ADDR_A may be 0x11001111. When the received address ADDR_A 0x11001111 is transferred to the hash function circuit 110, the hash function circuit 110 may output "00" as the received address hash result AA_HR in the same way.

For example, the failed addresses ADDR_F may be 0x10001101 and 0x10001111. The fail-address hash result FA_HR corresponding to the failed address ADDR_F 0x10001101 may be "11." The failed address hash result FA_HR corresponding to the failed address ADDR_F 0x10001111 may be "10." The failed address hash results FA_HR "11" and "10" may be stored in the hash array circuit 130. For example, the received address ADDR_A 0x11001111 does not coincide with any one of 0x10001101 and 0x10001111 included in the failed addresses ADDR_F and the received address hash result AA_HR "00" does not coincide with "11" and "10" included in the failed address hash results FA_HR. Because the received address hash result AA_HR does not coincide with any one of the fail-address hash results FA_HR, the determination result signal DRS outputted from the bloom-filter circuit 100 may be the second logic level. Thus, when the determination result signal DRS is the second logic level, the received address ADDR_A may not be included in the failed addresses ADDR_F.

In an example embodiment, when the received address hash result AA_HR does not coincide with any one of the fail-address hash results FA_HR, the bloom-filter circuit 100 may output the determination result signal DRS having a second logic level.

As a result, when the determination result signal DRS is the second logic level, the received address ADDR_A is not included in the failed addresses ADDR_F. However, when the determination result signal DRS is the first logic level, it is possible that the received address ADDR_A is not included in the failed addresses ADDR_F. Therefore when the determination result signal DRS is the first logic level, an additional determination of whether the received address ADDR_A is included in the failed addresses ADDR_F or not may be used.

Figure 12:
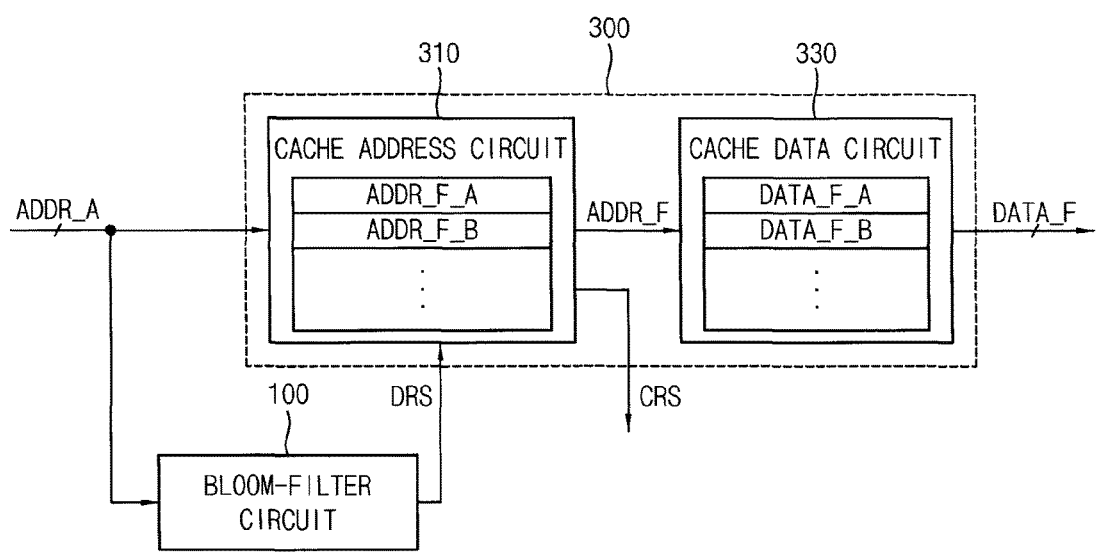
FIG. 12 is a block diagram illustrating the cache memory circuit and the bloom-filter circuit included in the memory device of FIG. 1 according to example embodiments.

FIG. 12 is a block diagram illustrating the cache memory circuit and the bloom-filter circuit included in the memory device of FIG. 1 according to example embodiments.

Referring to FIG. 12, the memory device 10 may include a cache memory circuit 300 and a bloom-filter circuit 100. The cache memory circuit 300 may include a cache address circuit 310 and a cache data circuit 330. The cache address circuit 310 may store the failed addresses ADDR_F. The cache data circuit 330 may store the repair data DATA_F.

In an example embodiment, the cache address circuit 310 may output the comparison result signal CRS as a result of a comparison between a received address ADDR_A and one of the failed addresses ADDR_F based on the determination result signal DRS. For example, when the determination result signal DRS is the first logic level, whether the received address ADDR_A coincides with one of the failed addresses ADDR_F or not may be determined. If the received address ADDR_A coincides with one of the failed addresses ADDR_F, the cache address circuit 310 may output the comparison result signal CRS having the first logic level.

When the determination result signal DRS is the first logic level, it is possible that the received address ADDR_A is not included in the failed addresses ADDR_F. Therefore when the determination result signal DRS is the first logic level, an additional determination of whether the received address ADDR_A is included in the failed addresses ADDR_F or not may be used. The possibility that a received address ADDR_A is one of failed addresses ADDR_F may be determined by the bloom-filter circuit 100. If the possibility that a received address ADDR_A is one of failed addresses ADDR_F exists, the bloom-filter circuit 100 may output the determination result signal DRS having the first logic level. The received address ADDR_A having the possibility that a received address ADDR_A is one of failed addresses ADDR_F may be very small portion of the received addresses. Therefore it may be not efficient that address bits of all received addresses are compared to address bits of the failed addresses ADDR_F. The possibility such that the received address ADDR_A is one of failed addresses ADDR_F may be determined by the bloom-filter circuit 100 and then the received address ADDR_A having the possibility such that the received address ADDR_A is one of failed addresses ADDR_F is compared to the failed addresses ADDR_F by the cache memory circuit 300. Thus, quantity of the logic operation may be decreased. As described above, one or more codes (e.g., m-bit codes) stored in the bloom filter circuit 100 may indicate a possibility that a received address corresponds to a stored failed address without positively indicating whether the received address corresponds to a stored failed address.

In an example embodiment, when the determination result signal DRS is the first logic level, the cache address circuit 310 may determine whether the received address ADDR_A coincides with one of the failed addresses ADDR_F or not. If the received address ADDR_A coincides with one of the failed addresses ADDR_F, the cache address circuit 310 may output the comparison result signal CRS having the first logic level. When the comparison result signal CRS is the first logic level, the cache data circuit 330 may output the repair data DATA_F corresponding to one of the failed address ADDR_F. For example, when the comparison result signal CRS is the first logic level, the cache data circuit 330 may output a first repair data DATA_F_A corresponding to a first failed address ADDR_F_A. Also, when the comparison result signal CRS is the first logic level, the cache data circuit 330 may output a second repair data DATA_F_B corresponding to a second failed address ADDR_F_B.

In an example embodiment, when the determination result signal DRS is a first logic level, the cache address circuit 310 may determine whether the received address ADDR_A coincides with one of the failed addresses ADDR_F or not. If the received address ADDR_A does not coincide with any one of the failed addresses ADDR_F, the cache address circuit 310 may output the comparison result signal CRS having a second logic level opposite to the first logic level. When the determination result signal DRS is the first logic level, it is possible that the received address ADDR_A is not included in the failed addresses ADDR_F. Therefore when the determination result signal DRS is the first logic level, an additional determination of whether the received address ADDR_A is included in the failed addresses ADDR_F or not may be used. For example, when the determination result signal DRS is the first logic level, if the received address ADDR_A does not coincide with any one of the failed addresses ADDR_F, the cache address circuit 310 may output the comparison result signal CRS having the second logic level.

In an example embodiment, when the determination result signal DRS is the second logic level, the cache address circuit 310 may output the comparison result signal CRS having the second logic level.

In an example embodiment, when the determination result signal DRS is the first logic level and the comparison result signal CRS is the first logic level, the selecting circuit 600 may select the repair data DATA_F. When the determination result signal DRS is the second logic level or the comparison result signal CRS is the second logic level, the selecting circuit 600 may select the read data DATA_A.

For example, the first logic level may be a logic high level. If the first logic level is the logic high level, the second logic level may be a logic low level. If the determination result signal DRS is the logic high level and the comparison result signal CRS is the logic high level, the selecting circuit 600 may select the repair data DATA_F. When the determination result signal DRS is the logic low level or the comparison result signal CRS is the logic low level, the selecting circuit 600 may select the read data DATA_A. For example, the first logic level may be the logic low level. If the first logic level is the logic low level, the second logic level may be the logic high level. If the determination result signal DRS is the logic low level and the comparison result signal CRS is the logic low level, the selecting circuit 600 may select the repair data DATA_F. When the determination result signal DRS is the logic high level or the comparison result signal CRS is the logic high level, the selecting circuit 600 may select the read data DATA_A.

Figure 13:
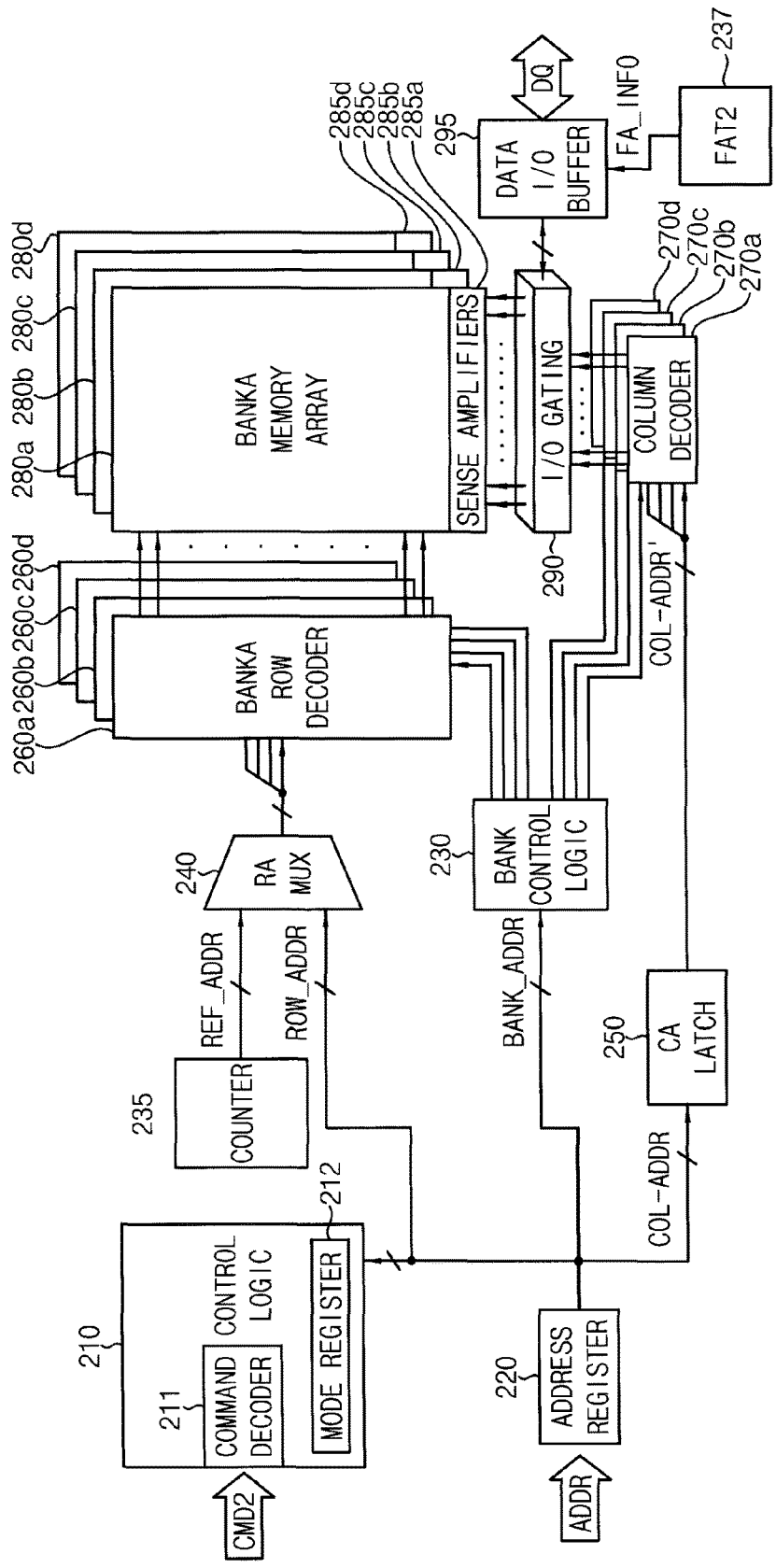
FIG. 13 is a block diagram illustrating an example of the memory device of FIG. 1 according to example embodiments.

FIG. 13 is a block diagram illustrating an example of the memory device of FIG. 1 according to example embodiments.

Referring to FIG. 13, the memory device 201 includes a control logic 210, an address register 220, a bank control logic 230, a row address multiplexer 240, a second fail address table 237, a refresh counter 235, a column address latch 250, a row decoder, a column decoder, a memory cell array, a sense amplifier circuit, an input/output gating circuit 290 and a data input/output buffer 295. In some embodiments, the memory device 201 may be a dynamic random access memory (DRAM), such as a double data rate synchronous dynamic random access memory (DDR SDRAM), a low power double data rate synchronous dynamic random access memory (LPDDR SDRAM), a graphics double data rate synchronous dynamic random access memory (GDDR SDRAM), a Rambus dynamic random access memory (RDRAM), etc.

The memory cell array may include first through fourth bank arrays 280a, 280b, 280c and 280d. The row decoder may include first through fourth bank row decoders 260a, 260b, 260c and 260d respectively coupled to the first through fourth bank arrays 280a, 280b, 280c and 280d, the column decoder may include first through fourth bank column decoders 270a, 270b, 270c and 270d respectively coupled to the first through fourth bank arrays 280a, 280b, 280c and 280d, and the sense amplifier circuit may include first through fourth bank sense amplifiers 285a, 285b, 385c and 385d respectively coupled to the first through fourth bank arrays 280a, 280b, 280c and 280d. The first through fourth bank arrays 280a, 280b, 280c and 280d, the first through fourth bank row decoders 260a, 260b, 260c and 260d, the first through fourth bank column decoders 270a, 270b, 270c and 270d and the first through fourth bank sense amplifiers 285a, 285b, 285c and 285d may form first through fourth banks. Although the volatile memory device 200 is illustrated in FIG. 3 as including four banks, the volatile memory device 200 may include any number of banks.

The address register 220 may receive an address ADDR including a bank address BANK_ADDR, a row address ROW_ADDR and a column address COL_ADDR from a memory controller (not illustrated). The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through fourth bank row decoders 260a, 260b, 260c and 260d corresponding to the bank address BANK_ADDR may be activated in response to the bank control signals, and one of the first through fourth bank column decoders 270a, 270b, 270c and 270d corresponding to the bank address BANK_ADDR may be activated in response to the bank control signals.

The row address multiplexer 240 may receive the row address ROW_ADDR from the address register 220, and may receive a refresh row address REF_ADDR from the refresh counter 235. The row address multiplexer 240 may selectively output the row address ROW_ADDR or the refresh row address CREF_ADDR. A row address output from the row address multiplexer 240 may be applied to the first through fourth bank row decoders 260a, 260b, 260c and 260d.

The activated one of the first through fourth bank row decoders 260a, 260b, 260c and 260d may decode the row address output from the row address multiplexer 240, and may activate a word line corresponding to the row address. For example, the activated bank row decoder may apply a word line driving voltage to the word line corresponding to the row address.

The column address latch 250 may receive the column address COL_ADDR from the address register 220, and may temporarily store the received column address COL_ADDR.

In some embodiments, in a burst mode, the column address latch 250 may generate column addresses COL_ADDR' that increment from the received column address COL_ADDR. The column address latch 250 may apply the temporarily stored or generated column address COL_ADDR' to the first through fourth bank column decoders 270a, 270b, 270c and 270d.

The activated one of the first through fourth bank column decoders 270a, 270b, 270c and 270d may decode the generated column address COL_ADDR' output from the column address latch 250, and may control the input/output gating circuit 290 to output data corresponding to the generated column address COL_ADDR'.

The input/output gating circuit 290 may include circuitry for gating input/output data. The input/output gating circuit 290 may further include an input data mask logic, read data latches for storing data output from the first through fourth bank arrays 280a, 280b, 280c and 280d, and write drivers for writing data to the first through fourth bank arrays 280a, 280b, 280c and 280d.

Data DQ to be read from one bank array of the first through fourth bank arrays 280a, 280b, 280c, and 280d may be sensed by a sense amplifier coupled to the one bank array, and may be stored in the read data latches. The data DQ stored in the read data latches may be provided to the memory controller via the data input/output buffer 295. Data DQ to be written to one bank array of the first through fourth bank arrays 280a, 280b, 280c and 280d may be provide from the memory controller to the data input/output buffer 295. The data DQ provided to the data input/output buffer 295 may be written to the one array bank via the write drivers.

The control logic 210 may control operations of the memory device 200a. For example, the control logic 210 may generate control signals for the memory device 200a to perform a write operation or a read operation. The control logic 210 may include a command decoder 211 that decodes a command CMD received from the memory controller and a mode register 212 that sets an operation mode of the memory device 201. For example, the command decoder 211 may generate the control signals corresponding to the command CMD by decoding a write enable signal (/WE), a row address strobe signal (/RAS), a column address strobe signal (/CAS), a chip select signal (/CS), etc. The command decoder 211 may further receive a clock signal (CLK) and a clock enable signal (/CKE) for operating the memory device 201 in a synchronous manner.

When the memory device is implemented using a cache memory circuit based on the bloom-filter circuit disclosed herein, a space of the cache memory circuit and the bloom-filter circuit included in the memory device may be efficiently decreased.

Figure 14:
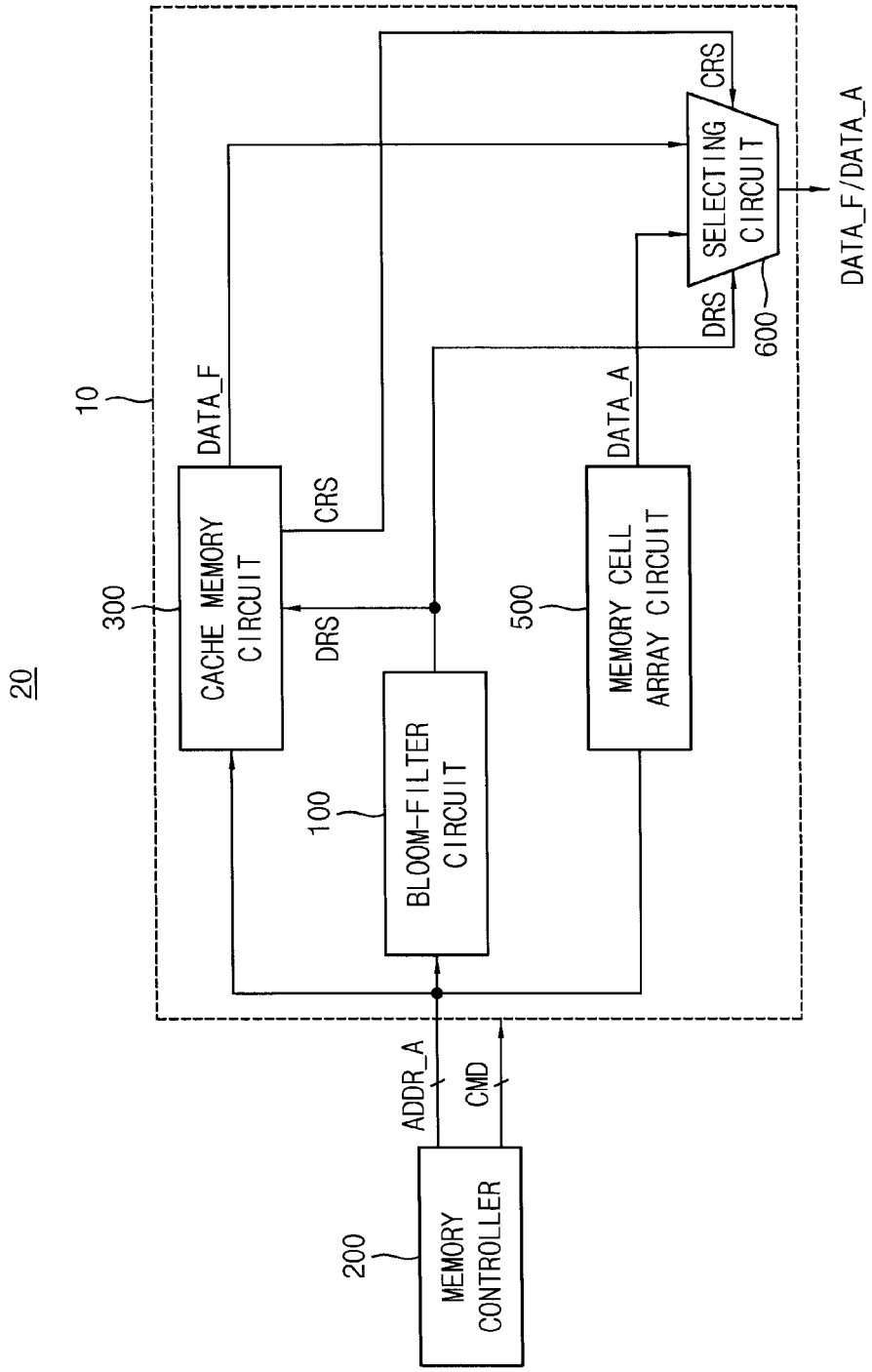
FIG. 14 is a block diagram illustrating a memory system according to an example embodiment.

FIG. 14 is a block diagram illustrating a memory system according to an example embodiment.

Referring to FIG. 14, the memory system 20 includes a memory controller 200 and a memory device 10. The memory controller 200 outputs a received address ADDR_A and a command CMD. The memory device 10 provides one of a repair data DATA_F and read data DATA_A based on the received address ADDR_A and the command CMD. The memory device 10 includes a bloom-filter circuit 100, a cache memory circuit 300, a memory cell array circuit 500 and a selecting circuit 600.

The bloom-filter circuit 100 outputs a determination result signal DRS based on determining possibility. The possibility refers to a possibility that a received address ADDR_A is one of failed addresses ADDR_F corresponding to one or more failed memory cells of the memory cell array circuit 500. For example, when the received address ADDR_A coincides with one of the failed addresses ADDR_F, the determination result signal DRS outputted from the bloom-filter circuit 100 may be a first logic level. Also when the received address ADDR_A does not coincide with any one of the failed addresses ADDR_F, the determination result signal DRS outputted from the bloom-filter circuit 100 may be a second logic level. However, even though the received address ADDR_A does not coincide with any one of the failed addresses ADDR_F, the determination result signal DRS outputted from the bloom-filter circuit 100 may be the first logic level.

The cache memory circuit 300 may include a cache address circuit 310 and a cache data circuit 330. The cache memory circuit 300 may store the failed addresses ADDR_F and data corresponding to the respective failed addresses ADDR_F. The failed addresses ADDR_F may be stored in the cache address circuit 310. The data corresponding to the respective failed addresses ADDR_F may be stored in the cache data circuit 330. The cache memory circuit 300 may provide a comparison result signal CRS by determining whether the received address ADDR_A coincides with the one of the failed addresses ADDR_F or not based on the determination result signal DRS.

For example, when the determination result signal DRS is the first logic level, the cache memory circuit 300 may determine whether the received address ADDR_A coincides with the one of the failed addresses ADDR_F or not. If the received address ADDR_A coincides with the one of the failed addresses ADDR_F, the cache address circuit 310 may output the comparison result signal CRS having the first logic level. Also, when the determination result signal DRS is the first logic level, if the received address ADDR_A does not coincide with any one of the failed addresses ADDR_F, the cache address circuit 310 may output the comparison result signal CRS having the second logic level. For example, when the determination result signal DRS is the second logic level, the cache address circuit 310 may output the comparison result signal CRS having the second logic level.

The cache memory circuit 300 outputs the data corresponding to the respective failed addresses ADDR_F as repair data DATA_F when the received address ADDR_A coincides with the one of the failed addresses ADDR_F. For example, when the received address ADDR_A coincides with a first failed address ADDR_F_A, the cache memory circuit 300 may output a first repair data DATA_F_A corresponding to the first failed address ADDR_F_A. Also, when the received address ADDR_A coincides with a second failed address ADDR_F_B, the cache memory circuit 300 may output a second repair data DATA_F_B corresponding to the second failed address ADDR_F_B.

The memory cell array circuit 500 outputs data corresponding to the received address ADDR_A as a read data DATA_A. The selecting circuit 600 selects one of the read data DATA_A and the repair data DATA_F based on the determination result signal DRS and the comparison result signal CRS. For example, if the determination result signal DRS is the first logic level and the comparison result signal CRS is the first logic level, the selecting circuit 600 may select the repair data DATA_F. If the determination result signal DRS is the first logic level and the comparison result signal CRS is the second logic level, the selecting circuit 600 may select the read data DATA_A. If the determination result signal DRS is the second logic level, the selecting circuit 600 may select the read data DATA_A.

When the memory device 10 is implemented using a cache memory circuit based on the bloom-filter circuit disclosed herein, a space of the cache memory circuit and the bloom-filter circuit included in the memory device 10 may be efficiently decreased.

Figure 15:
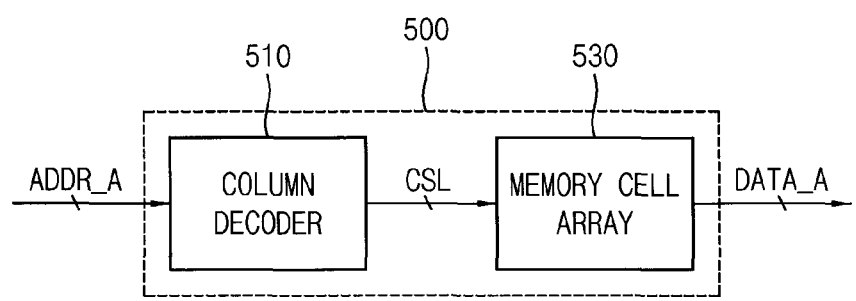
FIG. 15 is a block diagram illustrating an example of a memory cell array circuit included in the memory system of FIG. 14 according to example embodiments.
Figure 16:
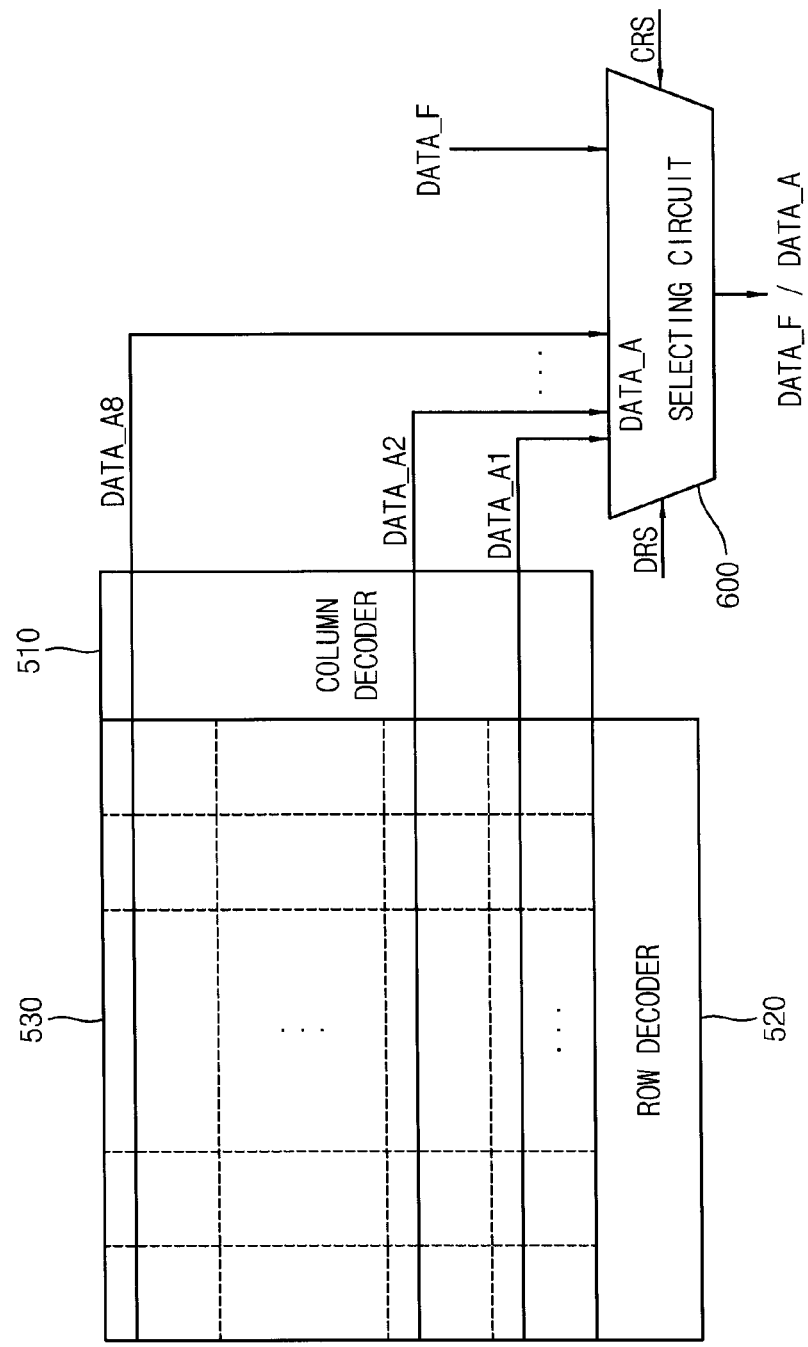
FIG. 16 is a diagram illustrating an operation example of a selecting circuit included in the memory system of FIG. 14 according to example embodiments.

FIG. 15 is a block diagram illustrating an example of a memory cell array circuit included in the memory system of FIG. 14 according to example embodiments. FIG. 16 is a diagram illustrating an operation example of a selecting circuit included in the memory system of FIG. 14 according to example embodiments.

Referring to FIGS. 15 and 16, the memory cell array circuit 500 may include a column decoder 510 and a memory cell array 530. The column decoder 510 may output a column selection signal CSL corresponding to the received address ADDR_A. The memory cell array 530 may include word lines and bit lines connected to a plurality of memory cells. The memory cell array 530 may output data corresponding to the received address ADDR_A as the read data DATA_A based on the column selection signal CSL. For example, the read data DATA_A may be 8 bits. The selecting circuit 600 may receive the repair data DATA_F and the read data DATA_A of 8 bits. When the determination result signal DRS is the first logic level and the comparison result signal CRS is the first logic level, the selecting circuit 600 may select the repair data DATA_F. When the determination result signal DRS is the second logic level or the comparison result signal CRS is the second logic level, the selecting circuit 600 may select the read data DATA_A of 8 bits.

In addition, in an embodiment of the present disclosure, a three-dimensional (3D) memory array is provided in the memory device 10. The 3D memory array is monolithically formed in one or more physical levels of arrays of memory cells having an active area disposed above a substrate, for example, a silicon substrate, and circuitry associated with the operation of those memory cells, whether such associated circuitry is above or within such substrate. The term "monolithic" means that layers of each level of the array are directly deposited on the layers of each underlying level of the array. The following patent documents, which are hereby incorporated by reference, describe suitable configurations for the 3D memory arrays, in which the 3D memory array is configured as a plurality of levels, with word lines and/or bit lines shared between levels: U.S. Pat. Nos. 7,679,133; 8,553,466; 8,654,587; 8,559,235; and U.S. Pat. Pub. No. 2011/0233648.

Figure 17:
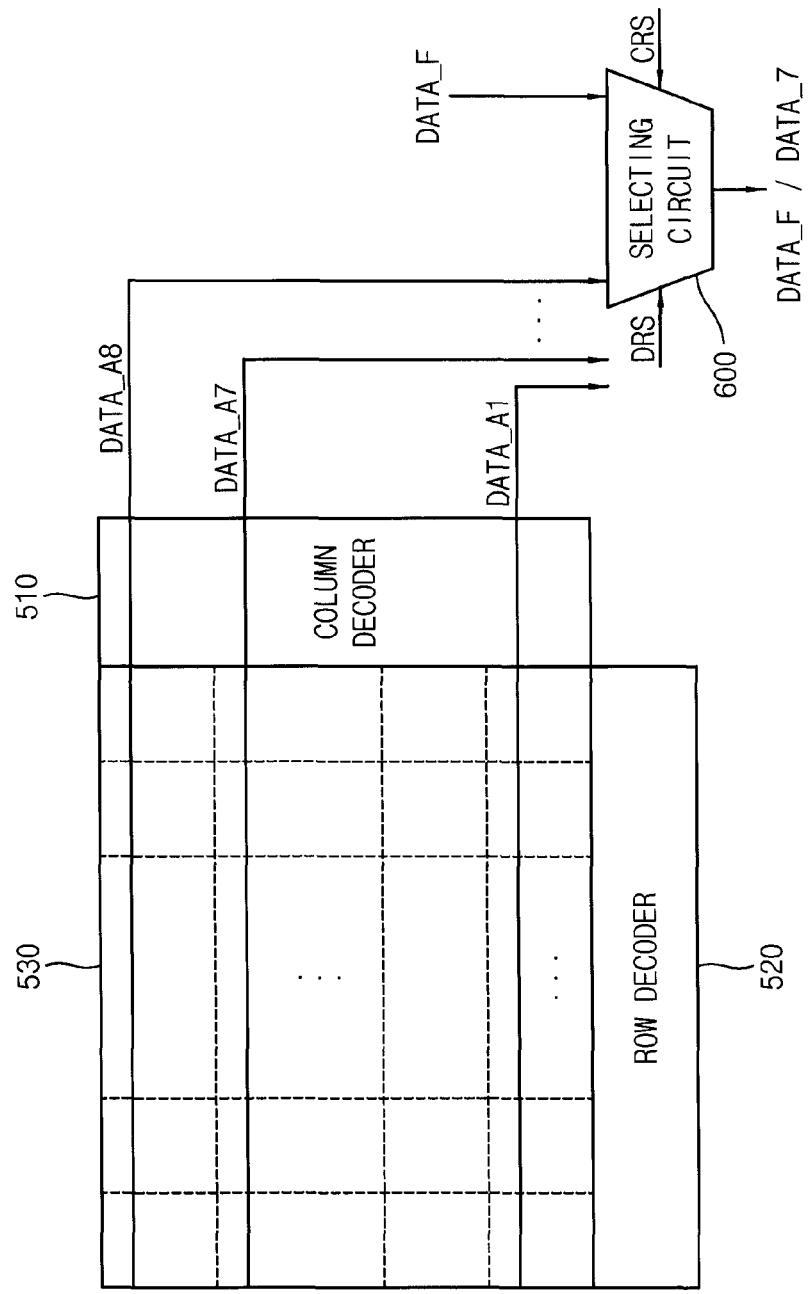
FIG. 17 is a diagram illustrating another operation example of the selecting circuit included in the memory system of FIG. 14 according to example embodiments.

FIG. 17 is a diagram illustrating another operation example of the selecting circuit included in the memory system of FIG. 14 according to example embodiments.

Referring to FIG. 17, when the received address ADDR_A coincides with the one of the failed addresses ADDR_F, a part of bits of the repair data DATA_F may be provided to the selecting circuit 600. For example, the read data DATA_A may be 8 bits. An error bit may be an eighth bit among 8 bits of the read data DATA_A. A memory cell corresponding to the eighth bit among 8 bits of the read data DATA_A may be an error cell (or, a failed cell). Memory cells corresponding to the first to seventh bits among 8 bits of the read data DATA_A may be normal cells. For example, the eighth bit among 8 bits of the read data DATA_A and one bit repair data DATA_F may be transferred to the selecting circuit 600. Because only one bit repair data DATA_F corresponding to the error cell is stored in the cache memory circuit 300, the cache memory circuit 300 may be efficiently used.

Figure 18:
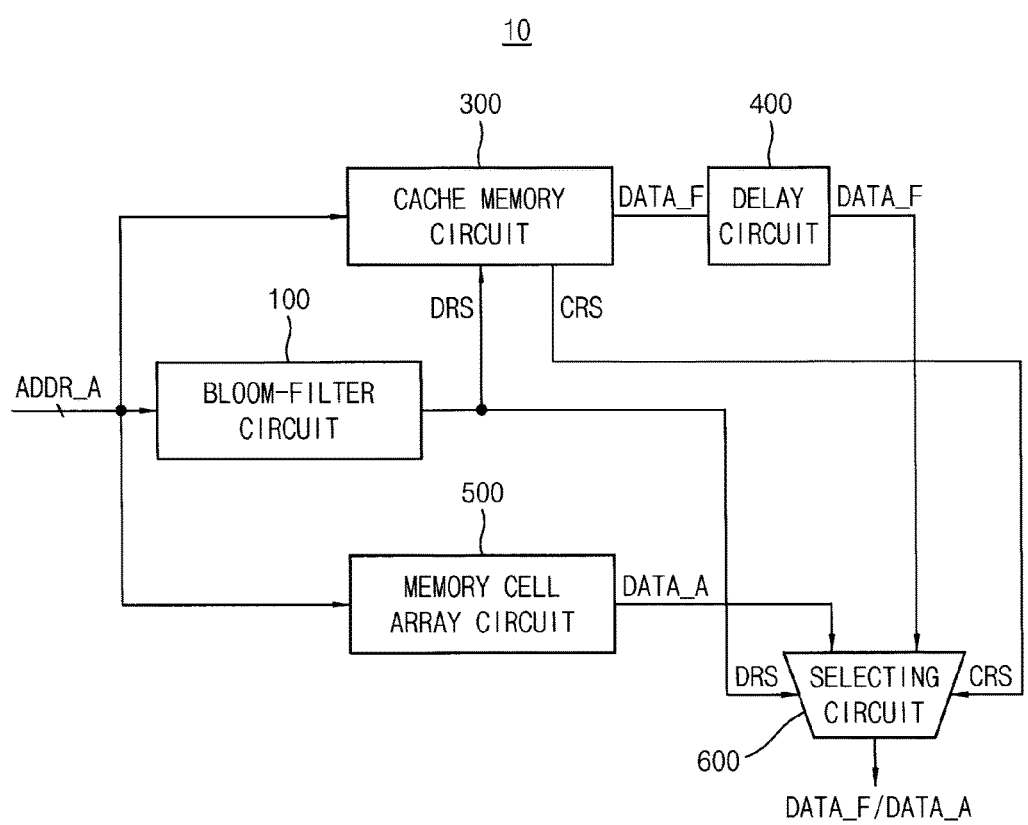
FIG. 18 is a block diagram illustrating a memory device according to an example embodiment.

FIG. 18 is a block diagram illustrating a memory device according to an example embodiment.

Referring to FIG. 18, a memory device 10 includes a bloom-filter circuit 100, a cache memory circuit 300, a memory cell array circuit 500, a selecting circuit 600 and a delay circuit 400. The bloom-filter circuit 100 outputs a determination result signal DRS based on determining possibility. The possibility is such that a received address ADDR_A is one of failed addresses ADDR_F corresponding to failed cells. The cache memory circuit 300 may include a cache address circuit 310 and a cache data circuit 330. The cache memory circuit 300 may store the failed addresses ADDR_F and data corresponding to the respective failed addresses ADDR_F. The failed addresses ADDR_F may be stored in the cache address circuit 310. The data corresponding to the respective failed addresses ADDR_F may be stored in the cache data circuit 330. The cache memory circuit 300 may provide a comparison result signal CRS by determining whether the received address ADDR_A coincides with the one of the failed addresses ADDR_F or not based on the determination result signal DRS. The cache memory circuit 300 outputs the data corresponding to the failed addresses ADDR_F as repair data DATA_F when the received address ADDR_A coincides with one of the failed addresses ADDR_F. The memory cell array circuit 500 outputs data corresponding to the received address ADDR_A as a read data DATA_A. The selecting circuit 600 selects one of the read data DATA_A and the repair data DATA_F based on the determination result signal DRS and the comparison result signal CRS.

In an example embodiment, a time interval between the read data DATA_A and the repair data DATA_F may be controlled using a delay circuit 400. The delay circuit 400 may include, for example, one or more delay cells.

Figure 19:
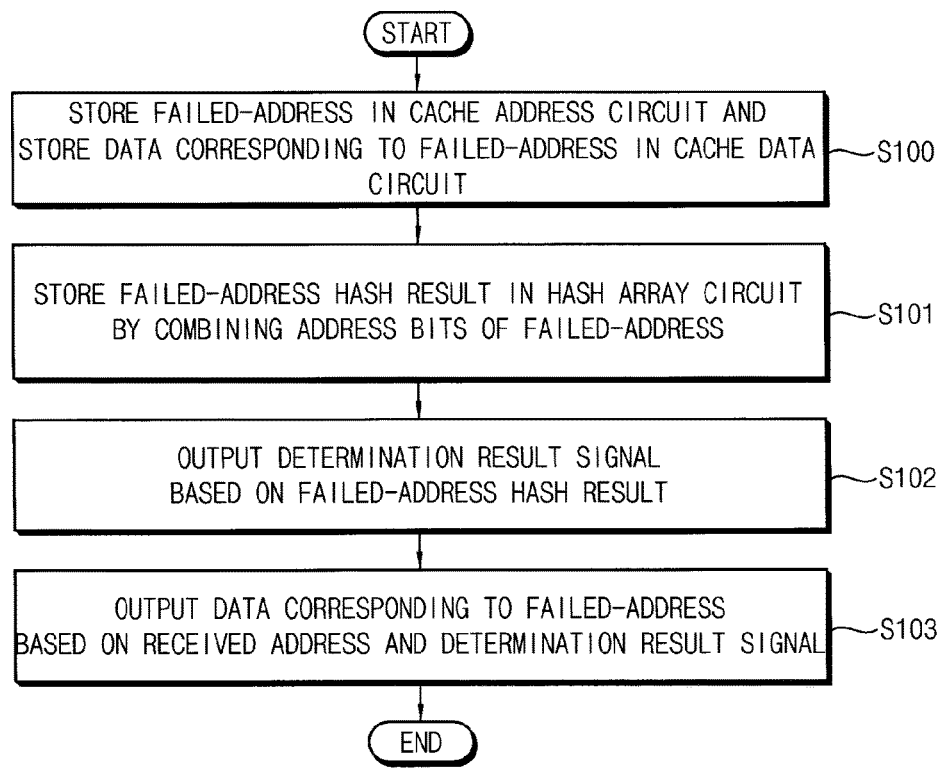
FIG. 19 is a flow chart illustrating a method of operating memory device according to example embodiments.

FIG. 19 is a flow chart illustrating a method of operating memory device according to example embodiments.

Referring to FIGS. 1 to 3 and 19, in a method of operating a memory device 10, failed addresses ADDR_F may be stored in a cache address circuit 310 and data corresponding to the respective failed addresses ADDR_F may be stored in a cache data circuit 330 (S100). The cache address circuit 310 and the cache data circuit 330 may be included in a cache memory circuit 300.

Failed address hash results FA_HR may be stored in a hash array circuit 130 by combining address bits of the failed address ADDR_F (S101). Each of the failed address hash results FA_HR may have a lesser number of bits than the number of the address bits of the failed address ADDR_F. The bloom-filter circuit 100 may include the hash function circuit 110 and the hash array circuit 130. The hash function circuit 110 may output a received address hash result AA_HR by combining address bits of the received address ADDR_A. The received address hash result AA_HR may have a lesser number of bits than the number of the address bits of the received address ADDR_A. The hash array circuit 130 may store failed address hash results FA_HR corresponding to the failed addresses ADDR_F.

A determination result signal DRS may be outputted by determining possibility based on the failed address hash results FA_HR (S102). The possibility may be such that a received address ADDR_A is one of failed addresses ADDR_F corresponding to failed cells. For example, when the received address ADDR_A coincides with one of the failed addresses ADDR_F, the determination result signal DRS outputted from the bloom-filter circuit 100 may be a first logic level. Also when the received address ADDR_A does not coincide with any one of the failed addresses ADDR_F, the determination result signal DRS outputted from the bloom-filter circuit 100 may be a second logic level. However, even though the received address ADDR_A does not coincide with any one of the failed addresses ADDR_F, the determination result signal DRS outputted from the bloom-filter circuit 100 may be the first logic level.

Data corresponding to the fail-address ADDR_F may be outputted as a repair data DATA_F based on the received address ADDR_A and the determination result signal DRS (S103). For example, when the determination result signal DRS is the first logic level, the cache memory circuit 300 may determine whether the received address ADDR_A coincides with one of the failed addresses ADDR_F or not. If the received address ADDR_A coincides with one of the failed addresses ADDR_F, the cache memory circuit 300 may output the repair data DATA_F corresponding to the failed address ADDR_F.

Figure 20:
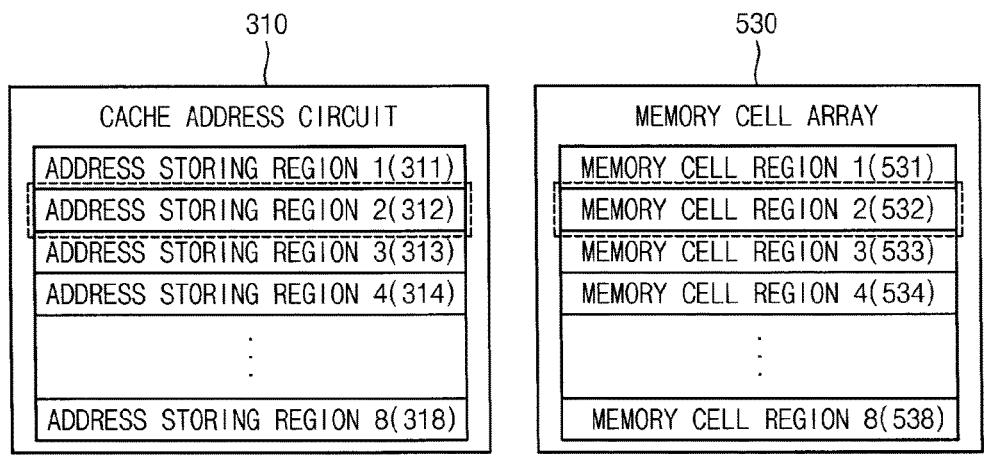
FIGS. 20 and 21 are diagrams illustrating examples of an address storing region storing a failed address corresponding to a bad cell of a memory cell region included in a memory cell array.
Figure 21:
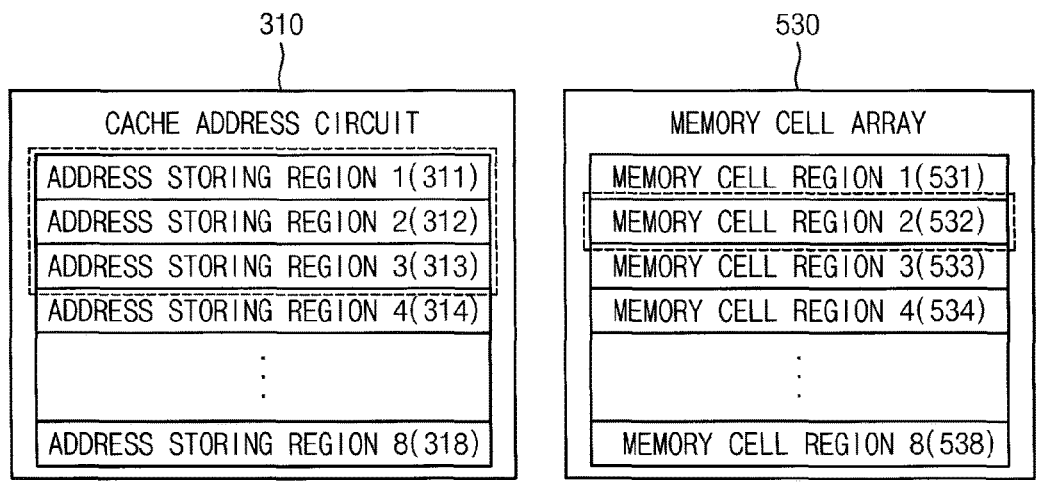

FIGS. 20 and 21 are diagrams illustrating examples of an address storing region storing a failed address corresponding to a failed cell of a memory cell region included in a memory cell array.

Referring to FIGS. 20 and 21, the cache address circuit 310 may be divided into a plurality of address storing regions. Each of the plurality of the address storing regions 311 to 318 may store the respective failed addresses ADDR_F corresponding to each of a plurality of memory cell regions 531 to 538 of the memory cell array 530. For example, the cache address circuit 310 may include first to eighth address storing regions 311 to 318. A memory cell array 530 of the memory device 10 may include first to eighth memory cell regions 531 to 538. The failed address ADDR_F corresponding to the second memory cell region 532 may be stored in the second address storing region 312. For example, each of the failed address ADDR_F stored in one of the storing regions 311 to 318 corresponds to data of a corresponding data storing region of the cache data circuit 330.

In an example embodiment, if a capacity of a data storing region of the cache data circuit corresponding to a failed address stored in a address storing region is less than a capacity of failed cells included in one of the memory cell regions 531 to 538, the failed address ADDR_F may be stored in at least two consecutive address storing regions of the address storing regions 311 to 318. For example, a failed address ADDR_F corresponding to the second memory cell region 532 may be stored in the second address storing region 312 as shown in FIG. 20. For example, if a capacity of a data storing region corresponding to a failed address stored in the second address storing region 312 is less than a capacity of failed cells included in the second memory cell region 532, the failed address ADDR_F may be stored in the first to the third address region 311 to 313 adjacent to the second address region 312.

Figure 22:
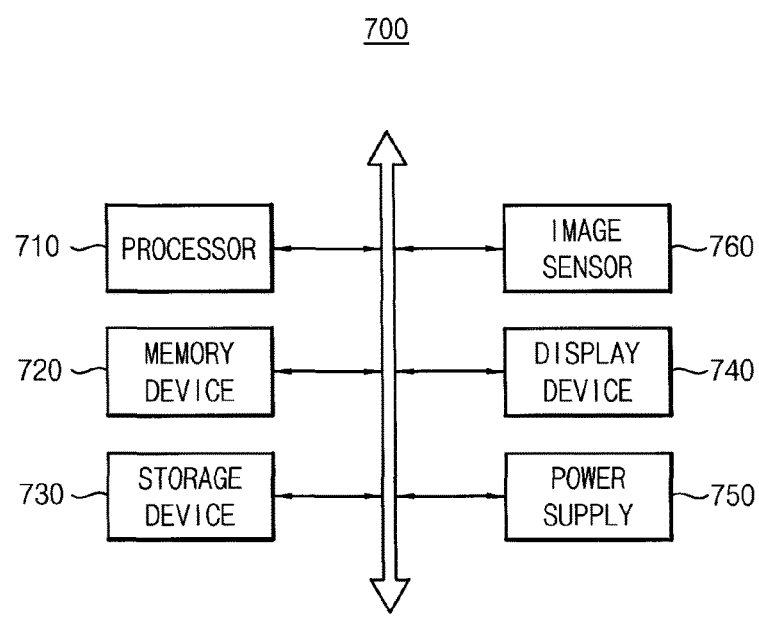
FIG. 22 is a block diagram illustrating a computing system including a memory system according to a certain embodiment.

FIG. 22 is a block diagram illustrating a computing system including a display system according to a certain embodiment.

Referring to FIG. 22, a computing system 700 may include a processor 710, a memory device 720, a storage device 730, a display device 740, a power supply 750 and an image sensor 760. The computing system 700 may further include ports that communicate with a video card, a sound card, a memory card, a USB device, other electronic devices, etc.

The processor 710 may perform various calculations or tasks. According to embodiments, the processor 710 may be a microprocessor or a CPU. The processor 710 may communicate with the memory device 720, the storage device 730, and the display device 740 via an address bus, a control bus, and/or a data bus. In some embodiments, the processor 710 may be coupled to an extended bus, such as a peripheral component interconnection (PCI) bus. The memory device 720 may store data for operating the computing system 700. For example, the memory device 720 may be implemented with, for example, a dynamic random access memory (DRAM) device, a mobile DRAM device, a static random access memory (SRAM) device, a phase-change random access memory (PRAM) device, a ferroelectric random access memory (FRAM) device, a resistive random access memory (RRAM) device, and/or a magnetic random access memory (MRAM) device. The memory device 720 may include the circuits of the memory device 10 of FIG. 1. The storage device 730 may include a solid state drive (SSD), a hard disk drive (HDD), a CD-ROM, etc. The computing system 700 may further include an input device such as a touchscreen, a keyboard, a keypad, a mouse, etc., and an output device such as a printer, a display device, etc. The power supply 750 supplies operation voltages for the computing system 700.

The image sensor 760 may communicate with the processor 710 via the buses or other communication links. The image sensor 760 may be integrated with the processor 710 in one chip, or the image sensor 760 and the processor 710 may be implemented as separate chips.

At least a portion of the computing system 700 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP). The computing system 700 may be a digital camera, a mobile phone, a smart phone, a portable multimedia player (PMP), a personal digital assistant (PDA), a computer, etc.

When the memory device 720 is implemented using the cache memory circuit based on the bloom-filter circuit disclosed herein, a space of the cache memory circuit and the bloom-filter circuit included in the memory device 720 may be efficiently decreased.

Figure 23:
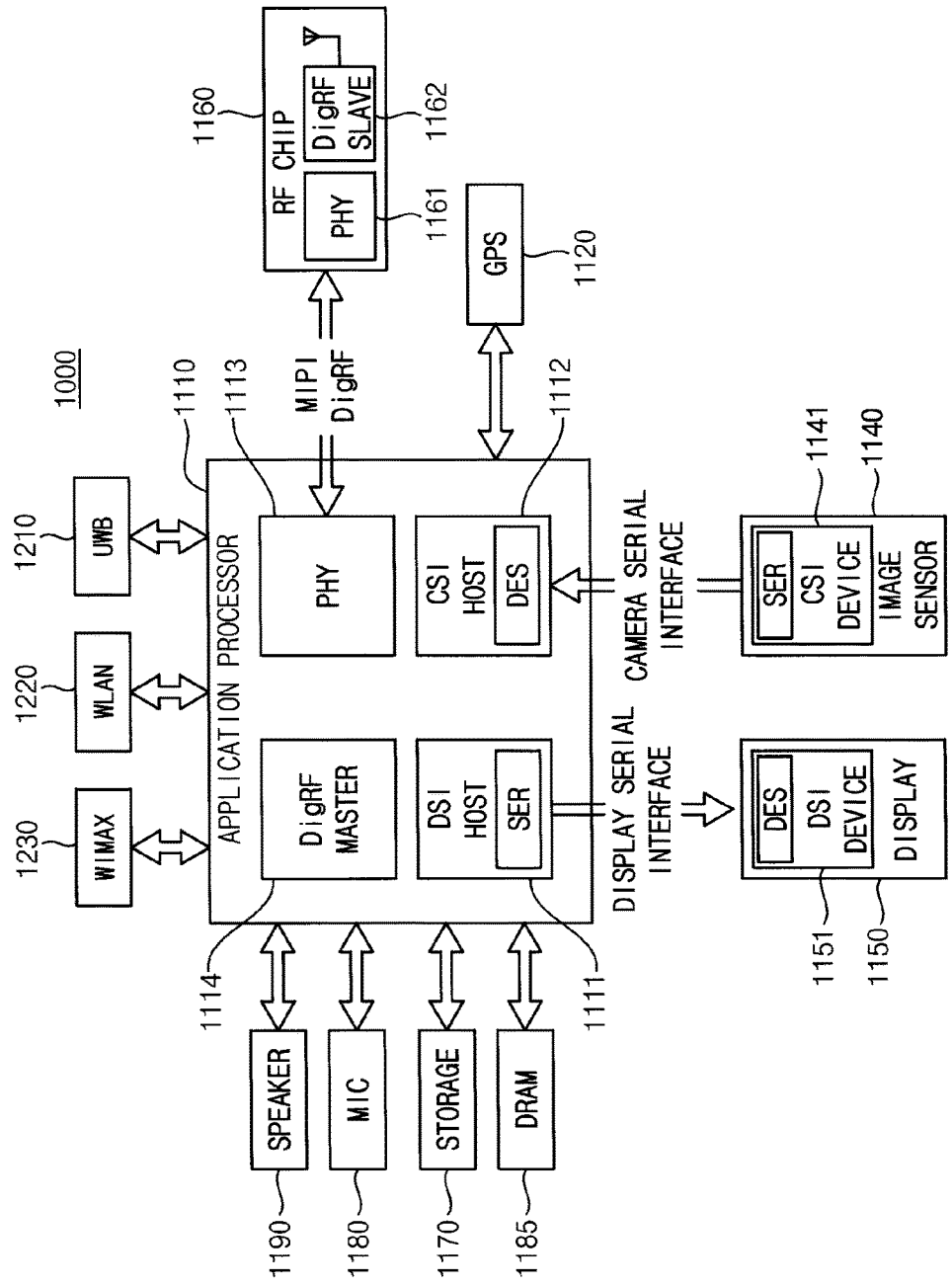
FIG. 23 is a block diagram illustrating an example of an interface used in the computing system of FIG. 22 according to a certain embodiment.

FIG. 23 is a block diagram illustrating an example of an interface used in the computing system of FIG. 22 according to certain embodiments.

Referring to FIG. 23, a computing system 1000 may be implemented by a data processing device that uses or supports a mobile industry processor interface (MIPI) interface. The computing system 1000 may include an application processor 1110, an image sensor 1140, a display device 1150, etc. The display device 1150 may include the source driver according to example embodiments as described with reference to FIGS. 10 and 11. A CSI host 1112 of the application processor 1110 may perform a serial communication with a CSI device 1141 of the image sensor 1140 via a camera serial interface (CSI). In some embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI).

In some embodiments, the DSI host 1111 may include a serializer (SER), and the DSI device 1151 may include a deserializer (DES). The computing system 1000 may further include a radio frequency (RF) chip 1160 performing a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications of the PHY 1161.

The computing system 1000 may further include a global positioning system (GPS) 1120, a storage 1170, a MIC 1180, a DRAM device 1185, and a speaker 1190. In addition, the computing system 1000 may perform communications using an ultra wideband (UWB) 1120, a wireless local area network (WLAN) 1220, a worldwide interoperability for microwave access (WIMAX) 1130, etc. Other structures and interfaces of the electric device 1000 may also be used. For example, the DRAM device 1185 may include the circuits of the memory device 10 of FIG. 1.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of inventive concepts. Accordingly, all such modifications are intended to be included within the scope of inventive concepts as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A memory device including a memory cell array, comprising:
a bloom-filter circuit configured to receive n bits of a first address, where n is a natural number, and to output a determination result signal that indicates that there is a possibility that the first address is one of failed addresses corresponding to failed cells of the memory cell array,
wherein the bloom-filter circuit includes:
a first circuit configured to output a first m-bit code by combining the n bits of the first address, wherein m is a natural number less than n; and
a second circuit configured to store a set of one or more second m-bit codes corresponding to the failed addresses, and
wherein the bloom-filter circuit is configured to output the determination result signal based on a result of a first comparison between the first m-bit code and one or more of the second m-bit codes corresponding to the failed addresses;
a cache memory circuit configured to receive the n bits of the first address and store the failed addresses and a first set of data corresponding to the respective failed addresses, and configured to, in response to the determination result signal indicating the possibility, compare the n bits of the first address with one or more of the failed addresses and provide a comparison result signal by determining whether the first address coincides with one of the failed addresses, wherein n is a natural number; and
a selecting circuit configured to receive both of first data of the first set of data and second data of the memory cell array corresponding to the first address and configured to output either the first data or the second data based on the determination result signal and the comparison result signal,
wherein the cache memory circuit is configured to perform a second comparison of the n bits of the first address with one or more of the failed addresses in response to the determination result signal indicating the possibility and configured to output the comparison result signal based on a result of the second comparison, and
wherein the memory device is configured to, when the determination result signal indicates that the first address is not one of the stored failed addresses, prevent the second comparison between the first address and the stored failed addresses.

2. The memory device of claim 1, wherein the first circuit of the bloom-filter circuit is a hash function circuit configured to generate the first m-bit code and the set of one or more second m-bit codes.

3. The memory device of claim 1, wherein the bloom-filter circuit is configured to output the determination result signal with a first logic level in response to the first m-bit code corresponding to the first address coinciding with one of the second m-bit codes corresponding to the failed addresses, output the determination result signal having a first logic level.

4. The memory device of claim 3, wherein the bloom-filter circuit is configured to, when the first m-bit code corresponding to the first address does not coincide with any of the second m-bit codes corresponding to the failed addresses, output the determination result signal having a second logic level opposite to the first logic level.

5. The memory device of claim 1, wherein the cache memory circuit includes:
a cache address circuit configured to store the failed addresses; and
a cache data circuit configured to store the first set of data.

6. The memory device of claim 5, wherein the cache address circuit is configured to output the comparison result signal based on the result of the second comparison between the first address and the failed addresses.

7. The memory device of claim 5, wherein the cache address circuit is configured to, when the determination result signal is a first logic level, determine whether or not the first address coincides with one of the failed addresses, and
wherein the cache address circuit is configured to, when the first address coincides with one of the failed addresses, output the comparison result signal having the first logic level.

8. The memory device of claim 7, wherein the selecting circuit is configured to, when the comparison result signal is the first logic level, output the first data in response to the comparison result signal.

9. The memory device of claim 5,
wherein the cache address circuit is configured to, in response to the determination result signal having a first logic level, determine whether or not the first address coincides with one of the failed addresses, and
wherein the cache address circuit is configured to, in response to determining that the first address does not coincide with any one of the failed addresses, output the comparison result signal having a second logic level opposite to the first logic level.

10. The memory device of claim 9, wherein the cache address circuit is configured to, in response to the determination result signal being the second logic level, output the comparison result signal having the second logic level.

11. The memory device of claim 1,
wherein the selecting circuit is configured to, in response to the determination result signal being a first logic level and the comparison result signal being the first logic level, select the first data, and
wherein the selecting circuit is configured to, when the determination result signal is a second logic level opposite to the first logic level or the comparison result signal is the second logic level, select the second data.

12. A memory system comprising:
a memory controller configured to output the first address and a command; and
the memory device of claim 1, configured to receive the first address and the command.

13. The memory system of claim 12, wherein the memory device further includes:
a column decoder configured to output a column selection signal corresponding to the first address,
wherein the memory cell array is configured to output the second data in response to the column selection signal.

14. The memory system of claim 13, wherein the memory cell array comprises a three-dimensional memory array including a plurality of levels in which word-lines and/or bit-lines are shared between levels.

15. A memory device including a memory cell array, comprising:
a first circuit configured to receive n bits of a first n-bit address and output a first output signal indicating whether or not the memory device has a possibility of coincidence between the first n-bit address and one of one or more failed n-bit addresses, n being a natural number greater than 1, wherein the first circuit is configured to:
generate an m-bit code by combining the n bits of the first n-bit address, m being a natural number less than n,
store a first set of one or more m-bit codes corresponding to the one or more failed n-bit addresses, and
output the first output signal based on a result of a first comparison between the m-bit code corresponding to the first n-bit address and the stored first set of one or more m-bit codes corresponding to the one or more failed n-bit addresses;
a second circuit configured to receive the n bits of the first n-bit address and store the one or more failed n-bit addresses and a first set of data corresponding to respective one or more failed n-bit addresses, and in response to the first output signal, perform a second comparison to compare the first n-bit address with one or more of the failed n-bit addresses and, based on a result of the second comparison, output a second output signal indicating whether the first n-bit address coincides with one of the one or more failed n-bit addresses;
a selecting circuit configured to receive both of first data of the first set of data and second data of the memory cell array corresponding to the first n-bit address and configured to output either the first data or the second data based on the first and second output signals, and
wherein the memory device is configured to, when the first output signal indicates that the first n-bit address is not one of the stored failed n-bit addresses, prevent the second comparison between the first address and the stored failed addresses.

16. The memory device of claim 15, wherein the selecting circuit is configured to, in response to the first output signal indicating that the m-bit code corresponding to the first n-bit address does not coincide with the stored first set of one or more m-bit codes corresponding to the one or more failed n-bit addresses, output the second data.

17. The memory device of claim 15, wherein the second circuit is one of a static random access memory (SRAM), a phase random access memory (PRAM), a ferroelectric random access memory (FRAM), a resistive random access memory (RRAM), and a magnetic random access memory (MRAM).

18. The memory device of claim 15, wherein the second circuit performs the second comparison only when the first output signal has indicated that the memory device has the possibility of coincidence.

19. The memory device of claim 1, wherein the cache memory circuit compares the n bits of the first address with the one or more of the failed addresses only when the determination result signal has indicated the possibility.

* * * * *